US009648494B2

(12) United States Patent
Norrman et al.

(10) Patent No.: US 9,648,494 B2
(45) Date of Patent: May 9, 2017

(54) PROTECTING A PAYLOAD SENT IN A COMMUNICATIONS NETWORK

(71) Applicant: TELEFONAKTIEBOLAGET L M ERICSSON (PUBL), Stockholm (SE)

(72) Inventors: Karl Norrman, Stockholm (SE); Vesa Lehtovirta, Espoo (FI); Monica Wifvesson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 200 days.

(21) Appl. No.: 14/438,761

(22) PCT Filed: Oct. 29, 2013

(86) PCT No.: PCT/SE2013/051263
§ 371 (c)(1),
(2) Date: Apr. 27, 2015

(87) PCT Pub. No.: WO2014/070085
PCT Pub. Date: May 8, 2014

(65) Prior Publication Data
US 2015/0257003 A1    Sep. 10, 2015

Related U.S. Application Data

(60) Provisional application No. 61/719,692, filed on Oct. 29, 2012.

(51) Int. Cl.
*H04L 9/32* (2006.01)
*H04W 12/04* (2009.01)
(Continued)

(52) U.S. Cl.
CPC ............ *H04W 12/04* (2013.01); *H04L 9/3273* (2013.01); *H04W 12/06* (2013.01); *H04L 9/32* (2013.01);
(Continued)

(58) Field of Classification Search
CPC ..... H04W 4/005; H04W 12/04; H04W 12/06; H04L 9/3273; H04L 63/0428;
(Continued)

(56) References Cited

U.S. PATENT DOCUMENTS

| 2009/0117877 | A1* | 5/2009 | Yang | H04L 63/06 455/411 |
| 2010/0228967 | A1* | 9/2010 | Hahn | H04W 12/06 713/155 |
| 2012/0254959 | A1* | 10/2012 | Schmidt | H04L 63/061 726/6 |

FOREIGN PATENT DOCUMENTS

WO    2010090569 A1    8/2010

OTHER PUBLICATIONS

Kungpisdan et al., "Secure Account-Based Mobile Payment Protocol", IEEE—Proceedings of the International Conference on Information Technology: Coding and Computing (ITCC'04)—2004.*
(Continued)

*Primary Examiner* — Jayesh Jhaveri
(74) *Attorney, Agent, or Firm* — Rothwell, Figg, Ernst & Manbeck, P.C.

(57) ABSTRACT

A method and apparatus for protecting a payload sent between a client device and a Network Application Function node (NAF) in a communications network. At either of the client device and the NAF a determination is made that no existing Security Association (SA) identifier between the client device and the NAF is locally available. An identifier embryo is obtained and an SA identifier is constructed using the identifier embryo. Payload sent between the client device and the NAF is protected using an SA associated with the constructed SA identifier.

21 Claims, 10 Drawing Sheets

(51) Int. Cl.
*H04W 12/06* (2009.01)
*H04L 29/06* (2006.01)
*H04W 4/00* (2009.01)

(52) U.S. Cl.
CPC ........ *H04L 63/0428* (2013.01); *H04L 63/061* (2013.01); *H04L 63/08* (2013.01); *H04L 63/0869* (2013.01); *H04W 4/005* (2013.01)

(58) Field of Classification Search
CPC ... H04L 63/061; H04L 63/08; H04L 63/0869; H04L 9/32
USPC ......................................................... 713/171
See application file for complete search history.

(56) References Cited

OTHER PUBLICATIONS

"3rd Generation Partnership Project; Technical Specification Group Services and System Aspects; Generic Authentication Architecture (GAA); Generic Bootstrapping Architecture (GBA) Push Layer Function (Release 11)," 3rd Generation Partnership Project, 3GPP TS 33.223 v11.0.0, Sep. 2012, 23 pages.

"3rd Generation Partnership Project; Technical Specification Group Services and System Aspects; Generic Authentication Architecture (GAA); Generic Bootstrapping Architecture (GBA) Push Layer (Release 11)", 3rd Generation Partnership Project; 3GPP TS 33.224 v11.0.0, Sep. 2012, 21 pages.

"3rd Generation Partnership Project; Technical Specification Group Services and System Aspects; Generic Authentication Architecture (GAA); Generic Bootstrapping Architecture (GBA) (Release 11)", 3rd Generation Partnership Project; 3GPP TS 33.220 v11.4.0, Sep. 2012, 92 pages.

Nokia, "UE triggered unsolicited push from BSF to NAFs", 3GPP TSG SA WG3 Security—S3#31, S3-030729, Nov. 18-21, 2003, 12 pages.

Ericsson, "MUK ID and UE ID in MBMS", 3GPP TSG SA WG3 Security—SA3#36, S3-041021, Nov. 23-26, 2004, 8 pages.

Notice of Reasons for Rejection issued in Japanese Patent Application No. 2015-539559, dated Jul. 5, 2016, 3 pages.

International Search Report issued in related International application No. PCT/SE2013/051263, dated Jan. 23, 2014, 5 pages.

Ericsson, "Clarification of UE registration procedure in Push-NAF," Change Request, S3-120794, 3GPP TSG-SA WG3 Meeting #68, Bratislave, Slovakia, Jul. 9-13, 2012, 3 pages.

Ericsson, "Introduction of GBA Push within TS 24.109—UPA Interface," Change Request, C1-091101 (was C1-090837, C1-090623), 3GPP TSG CT WG1 Meeting #57, San Antonio (TX), USA, Feb. 9-19, 2009, 9 pages.

\* cited by examiner

PROTECTING A PAYLOAD SENT IN A COMMUNICATIONS NETWORK

CROSS REFERENCE TO RELATED APPLICATION(S)

This application is a 35 U.S.C. §371 National Phase Entry Application from PCT/SE2013/051263 filed Oct. 29, 2013, which claims priority to U.S. Provisional Application No. 61/719,692, filed Oct. 29, 2012. The above identified applications are incorporated by reference in their entirety.

TECHNICAL FIELD

The present invention relates to the field of protecting a payload sent in a communications network.

BACKGROUND

3GPP is working with requirements and architecture for Machine Type Communication (MTC). MTC security aspects are considered in TR 33.868 Rel-12. The endpoints of security and corresponding security mechanisms are shown in FIG. 1 of section 4 of TR 33.868 Rel-12.

Two possible security endpoints of security are a client device such as a User Equipment (UE) and a MTC Server/Application. These represent a so called "Secure Connection", which is intended to be application layer security between the UE and MTC Server/Application. It is currently specified that the 3GPP operator may assist with key management for the Secure Connection, e.g. with the help of GBA (Generic Bootstrapping Architecture) [TS 33.220 sections 1-5], but otherwise the Secure Connection is assumed to be transparent to the 3GPP network. In principle, any security mechanisms can be used for the Secure Connection.

In the MTC architecture for Rel-12, a new use case for protecting the MTC device trigger from the SCS network server to the UE has been identified. Using Generic Push Layer (GPL) for end-to-end protection of the MTC device trigger was seen as favourable.

GBA is an authentication infrastructure. It includes a 3GPP Authentication Centre (AuC), a Universal Subscriber Identity Module (USIM) or an IP Multimedia Services Identity Module (ISIM), and the 3GPP Authentication and Key Agreement (AKA) protocol run between them, and is a very valuable asset of 3GPP operators. It was recognized in 3GPP Rel-6 that this infrastructure could be leveraged to enable application functions in the network and on the user side to establish shared keys. Therefore 3GPP provided the 'bootstrapping of application security' to authenticate the subscriber by defining a GBA based on AKA protocol in TS 33.220. There was a need seen at that time for several applications such as Multimedia Broadcast Multicast Service (MBMS), subscriber certificate distribution etc. This list of applications has expanded since then.

A simple GBA flow between a UE 1, a Bootstrapping Server Function (BSF) 2 and a Home Subscriber Server (HSS) or Home Location Register (HLR) 3 is illustrated in FIG. 1. A Bootstrapping Transaction Identifier (B-TID) value is generated by the BSF in a Network Access Identifier (NAI) format by taking a base64 encoded RAND value from step A3, and the BSF server name, i.e. base64encode (RAND)@BSF_servers_domain_name. The B-TID provided by the BSF 2 to the UE 1 identifies the established shared key Ks. The UE 1 uses the B-TID in all its communication with one or more Network Application Functions (NAFs) as follows. The shared key Ks is created by a concatenation of CK and IK (Ks=CK∥IK) in the UE 1 and the BSF 2.

3GPP defined the Generic Authentication Architecture (GAA). The adoption of GAA by other standardization bodies showed that some services cannot make the assumption that the UE 1 always has the possibility to connect to the BSF 2 or that the UE 1 for different reasons has not performed a bootstrapping procedure directly with the BSF 2. 3GPP therefore introduced and specified a GBA Push Function.

GBA-push is a mechanism to bootstrap the security between a NAF 4 and a UE 1, without forcing the UE 1 to contact the BSF 2 to initiate the bootstrapping. GBA-Push is closely related to and builds upon GBA as specified in TS 33.220. FIG. 2 illustrates a simple network architecture for GBA-push.

An exemplary use case is that a NAF 4 initiates establishment of a shared Security Association (SA), a NAF SA, between itself and the UE 1. This is done by the NAF 4 pushing all information, the so called GBA-Push-Info (GPI), needed for the UE 1 to set-up the SA. The key in this SA is a NAF-key and the GPI is requested from the BSF. The NAF-key is generated as defined in GBA, TS 33.220.

After the NAF SA establishment, the NAF 4 can send protected Push-messages to the UE 1. If a return channel exists, and if defined by a Ua application, the UE 1 can also use the established SA to protect response messages to the initiating NAF 4. The NAF SA is identified by downlink and uplink SA identifiers.

Furthermore, Generic Push Layer (GPL) was introduced in 3GPP Rel-9. GPL is a generic push layer that makes use of the GBA Push Function as specified in TS 33.223. The GPL specification in TS 33.224 includes a message format, cipher suites and processing model for a protocol to provide integrity and confidentiality protection of data sent between Push-NAFs and UEs. GPL assumes that keys and other SA parameters have been preinstalled in the Push-NAF 4 and UE 1 in the form of a NAF SA. GPL is a protection protocol that can be applied in a unidirectional or bidirectional fashion. The main purpose of GPL is to protect traffic pushed from a Push NAF to a UE.

It was expected that there would exist Push-NAF based services that rely on some form of per device session concept, and which would benefit from pushing more than one message based on the same security association to the UE 1. This required that GPL provided reply protection in addition to integrity protection (and possibly confidentiality protection) for several messages that are associated with each other (in contrast to only protect one single message). FIG. 3 depicts a usage scenario, where three push messages are delivered from the Push_NAF 4 to the UE 1 using a single security association.

A NAF 4 supporting and using GPL with a UE 1 needs to store at least one security association in downlink and one in uplink for each corresponding UE 1. A UE 1 supporting and using GPL needs to store at least one security association in downlink and one in uplink for each corresponding NAF 4.

The security association identifiers that have been specified in GBA Push TS 33.223, and which are inherited by GPL in TS 33.224 when TS 33.224 is used in conjunction with GBA Push in TS 33.223, to identify the security association used in uplink and downlink are the following:

Downlink SA identifier (DL_SA_ID): RAND@'naf'
Uplink SA identifier (UL_SA_ID): P-TID (a unique value in the Push NAF 4).

A new feature has been identified where the UE 1 is the initiator of the traffic between the UE 1 and the Push NAF 4. An example of this is where the UE 1 sends a payload in a Short Message Service (SMS) message protected by GPL to the push NAF 4. Since the UE 1 is the peer that initiates the traffic in this feature, the push NAF 4 may not yet have pushed down a NAF SA using GBA Push (TS 33.223) and neither has the push NAF 4 requested a NAF SA from the BSF 2 when the UEs GPL message arrives at the NAF 4.

The GPL specification in TS 33.224 does not support this use case, as it is based on the assumption that it is used in conjunction with the GBA Push specification in TS 33.223. One particular problem is that TS 33.223 describes that the UE 1 uses a Push Temporary Identifier (P-TID) in GPL as the identifier for the uplink (UL) security association. However, according to TS 33.223 the P-TID is an identifier that is supposed to be created by the push NAF 4. In the case when security associations are established with GBA (TS 33.220), it is not described how the push NAF 4 has allocated and assigned an uplink security association identifier to the UE 1, the UE 1 does not know what to use as an uplink security association identifier in the GPL message, and the Push NAF 4 does not know how to interpret the field. As a result GPL cannot be used in this example.

A further problem arises in the case where the push NAF 4 wants to use GPL, and wants to use an existing key from a normal GBA bootstrapping. Also in this case there will be problems related to the uplink security association identifier in GPL. In the current GBAPush specifications in TS 33.223, the P-TID (i.e. the uplink security association identifier) is integrity and confidentiality protected all the way from the BSF 2 to the UE 1 (it is included in the so called GBA-Push-Info (GPI)). Since the use case considered here does not send any GPI from the BSF 2 to the UE, there is again no uplink security association identifier provided to the UE 1. If the UE then needs to send a GPL message to the Push NAF, the uplink security association identifier is again amiss.

Another problem that needs to be considered is that in existing GPL specification in TS 33.224 it is assumed that the NAF 4 allocates the downlink security association identifier by taking the RAND received from BSF and uses it as the identifier of the down link security association in GPL for all downlink traffic protected by GPL to be sent to the UE 1. In TS 33.223 and TS 33.224 it is specified that the NAF 4 creates the downlink security association identifier as RAND@'naf'. The UE 1 then has the RAND from the GPI Information received from the NAF 4 in GBA Push prior to receiving any downlink traffic protected by GPL from the NAF 4. The UE 1 next creates the downlink security association identifier in the same way as the NAF 4 as described above.

However, if no GPI Information has been sent down by the push NAF 4 to the UE 1 prior to the push NAF 4 wanting to use GPL, then the UE 1 and the push NAF 4 have not established security associations from GBA Push and have no agreement on what to use as downlink security association identifier as described above, accordingly. If the push NAF 4 instead wants to use an existing key from a normal GBA bootstrapping then the push NAF 4 and the UE 1 need to use the B-TID allocated by the BSF 2 in normal GBA in existing specification in TS 33.220 or a new identifier based on B-TID, in order to construct a new downlink security association identifier to be used in GPL. In TS 33.220 the BSF allocates the B-TID as follows:

B-TID: base64encode(RAND)@BSF_servers_domain_name.

There is no existing mechanism to allow a NAF 4 to securely communicate with a client device such as a UE 1 when no GPL security associations have been established between the NAF 4 and the UE 1.

SUMMARY

It is an object to provide a mechanism for allowing a NAF to securely communicate with a client device such as a UE when no security associations are locally available.

According to a first aspect, there is provided a method of protecting a payload sent between a client device and a Network Application Function node (NAF) in a communications network. At either of the client device and the NAF, a determination is made that no existing Security Association (SA) identifier between the client device and the NAF is locally available. An identifier embryo is obtained and an SA identifier is constructed using the identifier embryo. Payload sent between the client device and the NAF is protected using an SA associated with the constructed SA identifier. An exemplary form of protection is encryption.

An advantage of this method is that SAs established with a normal GBA bootstrapping can be used for uplink and downlink protected payload, reducing signaling in the network. This is particularly useful where the protected payload is sent using a Generic Push Layer protocol.

As an option, the NAF receives) the identifier embryo from a Bootstrapping Function node (BSF). As a further option, the NAF sends a request message to the BSF, the request message including a request for the identifier embryo.

The identifier embryo optionally is selected from any of a B-TID, a P-TID and a P-TID embryo. Where the identifier embryo includes a P-TID embryo, the device and the NAF optionally independently calculate a P-TID by performing a one-way function on the P-TID embryo and a value known to both the client device and the NAF node. As a further option, the P-TID embryo is pushed from the BSF.

The identifier embryo optionally comprises a P-TID allocated to the NAF by the BSF.

The NAF optionally receives from the BSF a B-TID, allocates a P-TID for use in communicating with the client device, and sends the P-TID to the client device. As a further option, and prior to sending the P-TID to the client device, the method includes receiving from the client device a request for the P-TID. The P-TID is optionally allocated by applying a one-way function to the received B-TID and a further value.

According to a second aspect, there is provided a client device for use in a communications network. The client device is provided with a processor for determining that no SA identifier between the client device and a NAF node is locally available. A memory is provided for storing an identifier embryo, the processor being arranged to construct a SA identifier using the identifier embryo. A transmitter is provided for sending a payload towards the NAF, the payload being protected using a SA associated with the constructed SA identifier.

The identifier embryo is optionally any of a B-TID, a P-TID and a P-TID embryo.

Where the identifier embryo comprises a P-TID embryo, the processor is optionally further arranged to calculate a P-TID for use as the SA identifier by performing a one-way function on the P-TID embryo and a value known to both the client device and the NAF node.

According to a third aspect, there is provided a NAF for use in a communications network. The NAF is provided with a processor arranged to determine that no SA identifier between a client device and the NAF node is locally available. A receiver is provided for obtaining from a remote BSF an identifier embryo used between the client device and the BSF, the processor being further arranged to construct a SA identifier using the identifier embryo. A transmitter is also provided for sending to the client device payload data protected using the a SA associated with the constructed SA identifier.

The NAF is optionally provided with a second transmitter arranged to send a request message to the BSF, the request message including a request for the identifier embryo.

As an option, the identifier embryo comprises a P-TID embryo, the processor being further arranged to calculate a P-TID for use as the SA identifier by performing a one-way function on the P-TID embryo and a value known to both the client device and the NAF node.

The identifier embryo optionally comprises a P-TID allocated to the NAF node by the BSF. As an alternative option, the identifier embryo comprises a B-TID, wherein the processor is arranged to allocate a P-TID for use in communicating with the client device, and the transmitter is arranged to send the P-TID to the client device. In this case, the NAF is optionally provided with a second receiver for, prior to sending the P-TID to the client device, receiving from the client device a request for the P-TID. The processor is optionally arranged to allocate the P-TID by applying a one-way function to the received B-TID and a further value.

As an option, the NAF is provided with a third receiver for receiving from the client device payload data protected by the SA associated with the constructed SA identifier.

According to a fourth aspect, there is provided a computer program, comprising computer readable code means which, when run from a computer readable medium in the form of a memory in a processor in a client device, causes the client device to perform the method described above in the first aspect.

According to a fifth aspect, there is provided a computer program, comprising computer readable code means which, when run from a computer readable medium in the form of a memory in a processor in a NAF device, causes the NAF to perform the method described above in the first aspect.

According to a sixth aspect, there is provided a computer program product comprising a computer readable medium and a computer program described in the fourth or fifth aspects, wherein the computer program is stored on the computer readable medium.

According to a seventh aspect, there is provided a vehicle or vessel comprising any of a client device as described in the second aspect, or a NAF as described in the third aspect.

DETAILED DESCRIPTION

The description below is concerned with providing identifiers for Security Associations to be used between a client device and a Network Application function. For simplicity, the term User Equipment (UE) is used below as an example of a client device, but it will be appreciated that other types of client device that attach to a communication network may also be used. A UE in this context could typically be an MTC device which is used for MTC purposes. The UE could as well be a typical mobile phone held by a human user. The term UE is used herein for simplicity, and would include, for example and without limitation, mobile telecommunication devices, portable or handheld computing devices and desktop or installed computer A UE in the context of the description below contains an identifying module, such as a Universal Integrated Circuit Card (UICC) application or a GSM Subscriber Identity Module (SIM) application, in order to be able to use 3GPP GBA (as specified in TS 33.220). The UICC application is, for example, an USIM application or an ISIM application or any other UICC application. The UICC application e.g. USIM/ISIM application typically resides on a physical removable UICC card inserted into the UE. The UICC application e.g. USIM/ISIM application could also reside on an embedded UICC. UICC application e.g. USIM/ISIM application could also be implemented in a Trusted Execution Environment (TrE) in the device.

Two typical use cases are envisaged:

Use case 1: For NAF initiated downlink payload to be sent to the UE, the NAF uses security associations established with normal GBA in GPL to provide end-to-end protection of the payload.

Use case 2: For UE initiated uplink payload to be sent to the NAF, the UE uses security associations established with normal GBA in GPL to provide end-to-end protection of the payload.

Figure 4:
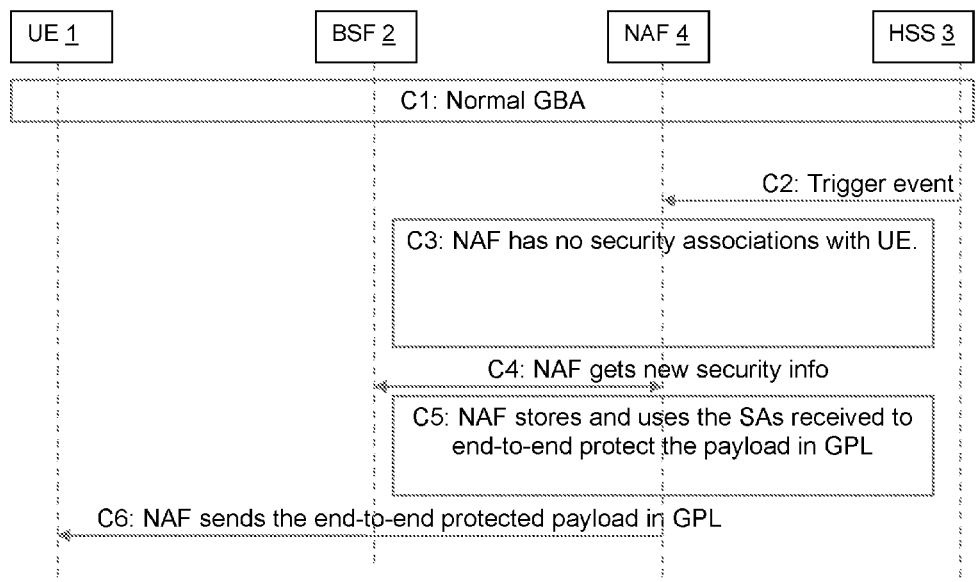
FIG. 4 is a signaling diagram showing an exemplary procedure for establishment of security associations.

FIG. 4 shows signaling between a UE 1, a NAF 4, a BSF 2 and a HSS/HLR 3 in establishing SAs between the UE 1 and the NAF 4 in the example of use case 1. The following numbering corresponds to that of FIG. 4:

C1: UE 1 initiates bootstrapping with BSF 2 on the Ub interface in GBA.

C2: An outside event triggers the NAF 4 to provide end-to-end protection to payload to be sent to UE 1.

C3: NAF 4 searches its databases but cannot find any stored security associations with this UE 1. NAF 4 needs to find out whether the BSF 2 has any security associations established with this UE 1.

C4: NAF 4 gets new security information from the BSF 2.

C5: NAF 4 stores and uses the security associations received from the BSF 2 to end-to-end protect the payload in GPL.

C6: NAF 4 sends the end-to-end protected payload in a GPL message to the UE 1

It should be noted that protocols other than GPL can be used. In particular, in any protocol where configuration information will be sent from the BSF 2 to the UE 1 in the GBA can be envisioned.

There are numerous embodiments described below how the NAF 4 and UE 1 agree on what uplink security association identifier (similar to P-TID defined for GBAPush in TS 33.223) the UE 1 should use in GPL protected traffic sent to the NAF 4 after step C6.

Figure 5:
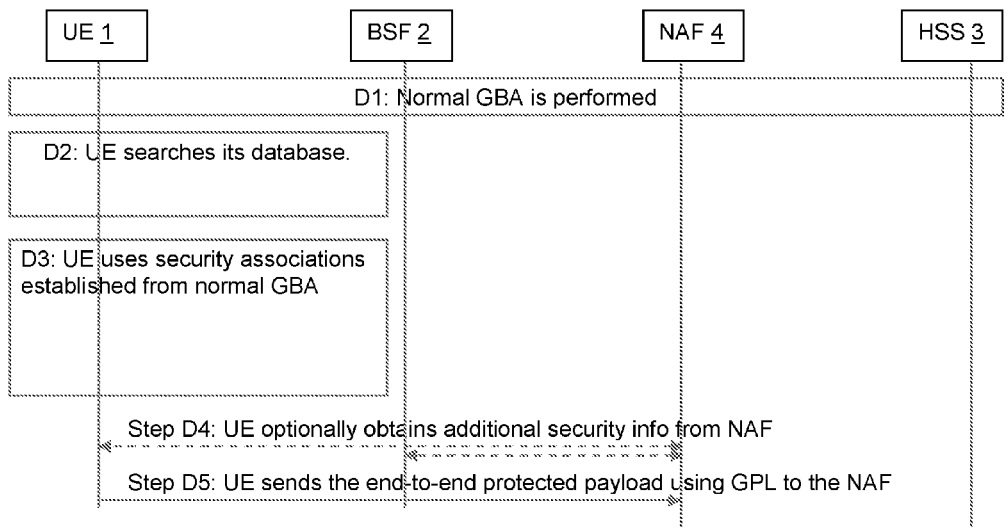
FIG. 5 is a signaling diagram showing an alternative exemplary procedure for establishment of security associations.

FIG. 5 shows signaling between the UE 1, the NAF 4, the BSF 2 and the HSS/HLR 3 in establishing SAs between the UE 1 and the NAF 4 in the example of use case 2. The following numbering corresponds to that of FIG. 5:

D1: UE 1 initiates bootstrapping with BSF 2 on the Ub interface in GBA.

D2: An event triggers the UE 1 to provide end-to-end protection of payload to be sent to NAF 4. UE 1 wants to use GPL for end-to-end protection. UE 1 searches its database.

D3. UE 1 has no security associations established with the NAF 4 from GBA Push. UE 1 has security associations established from normal GBA. UE 1 uses security associations established with this NAF 4 from normal GBA D4: UE 1 may optionally obtain some additional security info from the NAF 4. NAF 4 may contact BSF 2.

D5: UE 1 sends the end-to-end protected payload using GPL to the NAF 4.

When TS 33.224 is used in conjunction with normal GBA in TS 33.220, the identifiers to use in GPL in order to identify the security association used in uplink and downlink in GPL have not been specified. GPL requires:

one downlink security association identifier (DL_SA_ID) to identify a security association used for protected downlink data one uplink security association identifier (UL_SA_ID), to identify a security association used for protected uplink data Note that in normal GBA in TS 33.220, the security associations in the UE 1 and NAF 4 are identified by the B-TID which is generated in the BSF 2 in the format of a Network Access Identifier (NAI) by taking the base64 encoded RAND value, and the BSF 2 server name, i.e.

B-TID: base64encode(RAND)@BSF 2_servers_domain_name.

This implies that when GPL uses security associations generated by normal GBA, the downlink security association identifier in GPL may have a slightly different format compared to when security associations are generated by GBAPush. Furthermore, an uplink security association identifier (e.g. similar to the P-TID in TS 33.223) in GPL needs to be defined as well. In order to implement these use cases a number of issues need to be solved, the details of which are described below.

A first issue is how the NAF 4 finds out whether any security associations have been established in the UE 1 and the BSF 2 from a bootstrapping phase in normal GBA. The NAF 4 must obtain the security association identifiers such as the B-TID and the related security information from the BSF 2

In normal GBA, the security association identifier between the UE and BSF, i.e. the B-TID is allocated by the BSF 2 and the BSF 2 assigns the B-TID to the UE 1 on the Ub interface in the bootstrapping phase. This does not solve how the push NAF 4 obtains the B-TID and related security information from BSF 2.

A second issue is how to use the uplink security association identifier (e.g. similar to P-TID in GBAPush in TS 33.223) in GPL, when the security associations (SAs) are established with normal GBA (as discussed above). The P-TID is not defined in normal GBA in TS 33.220. The UE 1 does not know what to use as the identifier for the security association in GPL for uplink payload protected by GPL. The UE 1 has a security key to protect the payload but as the UE 1 and the push NAF 4 have no common understanding on how this security association is identified, the NAF 4 would not be able to identify the correct security association for an uplink payload protected by GPL sent by a UE 1, and hence the NAF 4 would not be able to decrypt the payload or verify its integrity correctly.

A third issue is how to solve the privacy issue if the UE 1 is using the same security association identifiers with multiple NAFs 4'. In existing specifications on normal GBA, the UE 1 needs to use the same B-TID as the key identifier with all NAF 4's it is communicating with. Therefore there is a privacy issue as a listener can identify what NAF 4's the same UE 1 is communicating with. This problem could be solved if the UE 1 and NAF 4 were allowed to use e.g. a hashed B-TID unique for each UE 1-NAF 4 pair.

To address each issue described above one or more possible embodiments are described in detail below.

A fourth issue is how the NAF 4 finds out whether any security associations have been established in UE 1 and BSF 2 at bootstrapping phase in normal GBA. Embodiments 1 and 2 below provide are exemplary ways to provide this information.

Embodiment 1

BSF 2 Pushes Security Info to NAF 4

The GBA User Security Setting (GUSS) as described in TS 33.220, which is stored in the HSS for each subscriber, is extended with a list of all NAF 4's supporting GPL with which the UE 1 communicates.

When the UE 1 initiates bootstrapping via the Ub interface with the BSF 2 in GBA, BSF 2 retrieves the GUSS information stored in the HSS 3. From the GUSS information, the BSF 2 is able to check the list of NAFs 4 with GPL capability and will then be able to push the B-TID, Ks_NAF 4 key and other security related information to theses NAFs 4.

Figure 6:
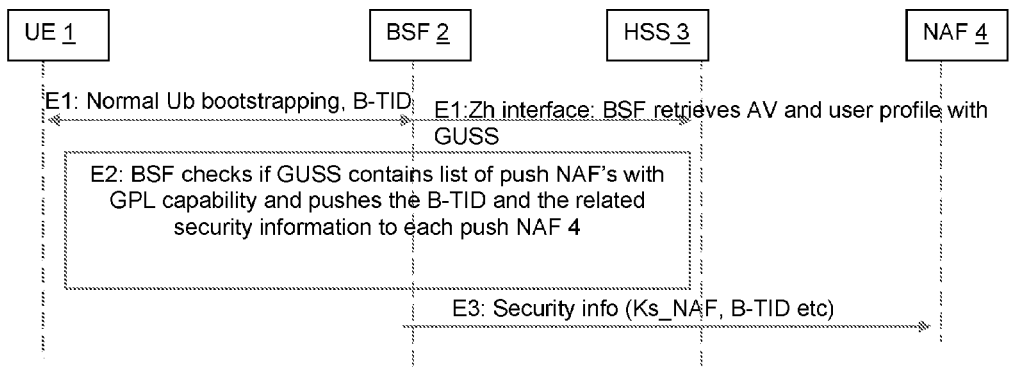
FIG. 6 is a signaling diagram showing an exemplary procedure for providing security associations in which a BSF pushes security information to a NAF.

This is illustrated in FIG. 6, with the following numbering corresponding to that of FIG. 6:

E1: The UE 1 and BSF 2 perform bootstrapping on the Ub interface as described in TS 33.220. The BSF 2 retrieves the AV and user profile with GUSS from the HSS 3 in this bootstrapping phase E2: The BSF 2 checks if GUSS contains a potential list of push NAFs 4 with GPL capability, with which the UE 1 may communicate. BSF 2 checks this list in GUSS in order to push the B-TID and the related security information to each push NAF 4 configured in this list for this UE 1.

E3: If the push NAF 4 is configured in the list, then the BSF 2 pushes the B-TID, Ks_NAF 4 and the related security information to the push NAF 4.

If NAF 4 has not received any B-TID and Ks_NAF 4, then the UE 1 is not bootstrapped and NAF 4 requests a GPI over Zpn and runs a GBA Push bootstrapping.

It is also possible that an entity other than the HSS 3 stores the Push NAFs that the UE 1 is registered or associated with. The BSF 2 could then retrieve the information from that entity instead from the HSS 3. The Push NAFs register their interest of being notified about UE 1 bootstrapping (for particular UEs or for groups of UEs). This registration may then be used by the BSF 2 or whatever entity notifies the push NAFs about UE 1 bootstrapping when such happen. The notifications could also be sent at a later stage than exactly when they occur.

Embodiment 2

NAF 4 Requests Security Info from BSF 2

In this embodiment, the NAF 4 requests the security information from BSF 2 using existing procedures. The NAF 4 may do this either as a preparation for communication with the UE 1, or the NAF 4 can do it upon receiving a GPL message from the UE 1.

Figure 7:
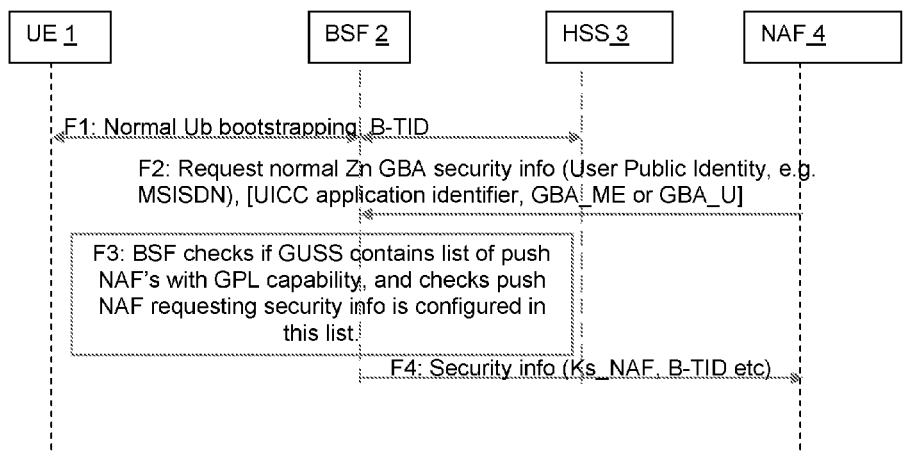
FIG. 7 is a signaling diagram showing an exemplary procedure for providing security associations in which a NAF request security information from a BSF.

The following numbering corresponds to that of FIG. 7:

F1: The UE 1 and BSF 2 perform bootstrapping on the Ub interface as described in TS 33.220. The BSF 2 retrieves the AV and user profile with GUSS from the HSS 3 in this bootstrapping phase F2: The NAF 4 could request the security information from the BSF 2 with existing procedures (normal Zn interface for GBA with some extensions) for a particular UE 1 by including the User Public Identity e.g. External Identifier or MSISDN.

F3: The BSF 2 checks if GUSS contains a potential list of push NAFs 4 with GPL capability, with which the UE 1 may communicate with. BSF 2 checks in this list in GUSS if the push NAF 4 requesting security info related to this particular UE 1 is configured in this list.

F4: If the push NAF 4 is configured in the list, then the BSF 2 responds with the B-TID, Ks_NAF 4 and the related security information to the push NAF 4.

As an additional option in step F2, it is possible for the NAF 4 to include the following additional information to the BSF 2: if the NAF 4 in addition requests the BSF 2 to check if any bootstrapping has been made for a particular UICC application (USIM or ISIM application or some other UICC application) by including an UICC application identifier in step F2, to the BSF 2, to indicate to the BSF 2 that it should only respond with security information related to a bootstrapping taken place between UE 1 and BSF 2 with this particular USIM application or ISIM application or some other UICC application.

As an additional option in step F2, it is possible for the NAF 4 to include the following additional information to the BSF 2: if the NAF 4 in addition requests the BSF 2 to check if any bootstrapping has been performed between Mobile Equipment (ME) and the BSF 2 or between USIM and BSF 2 by including a new parameter in step F2 indicating to the BSF 2 that NAF 4 would like to request security information related to a bootstrapping taken place between:

ME and BSF 2 (=GBA_ME); or

USIM and BSF 3 (=GBA_U);

The above two embodiments illustrate ways for the NAF 4 to determine whether any security associations have been established in UE 1 and BSF 2 during a normal GBA bootstrapping procedure.

Turning now to issue 2, how to use the uplink security association identifier in GPL when the SA's are established with normal GBA. The embodiments in this section are concerned with how different nodes allocate an uplink security association identifier, and how the uplink security association identifier becomes known to the UE 1.

The embodiments in this section are also concerned with how different nodes allocate a downlink security association identifier and how the downlink security association identifier becomes known to the UE 1.

Embodiment 3

In this embodiment the BSF 2 allocates the uplink security association identifier (e.g. a random number or some other, at least statistically unique identity) and provides it to the UE 1 over the Ub interface at the bootstrapping phase in normal GBA. The same uplink security association identifier is then provided by the BSF 2, in a novel extension made to the Zn interface, to 4 when they request a security context for a certain UE 1.

The GUSS for the UE 1 may keep the information whether the UE 1 supports GPL capability.

The UE 1 is able to send end-to-end protected payload using the GPL protocol to the NAF 4 as soon it has finalized the bootstrapping phase on Ub interface in normal GBA.

This embodiment has a drawback that the UE 1 would use the same uplink security association identifier with all NAFs 4 for uplink traffic. Privacy protection will not be perfect without the additional cost of a new bootstrapping. The same principle applies with the B-TID used for normal HTTPS based Ua interfaces (see, e.g., TS 33.222) where the UE 1 uses the same B-TID with all NAFs 4 and if that is not considered as a privacy problem, then the same applies to the uplink security association identifier used here. Note that, for uplink traffic, the UE 1 can re-bootstrap over the Ub interface in case there is a concern about using the same uplink security association identifier with two different NAFs 4.

In this embodiment the UE 1 could use either HTTPS or GPL or any other security protocol in steps G4 and G5, but the examples below show only GPL.

Figure 8:
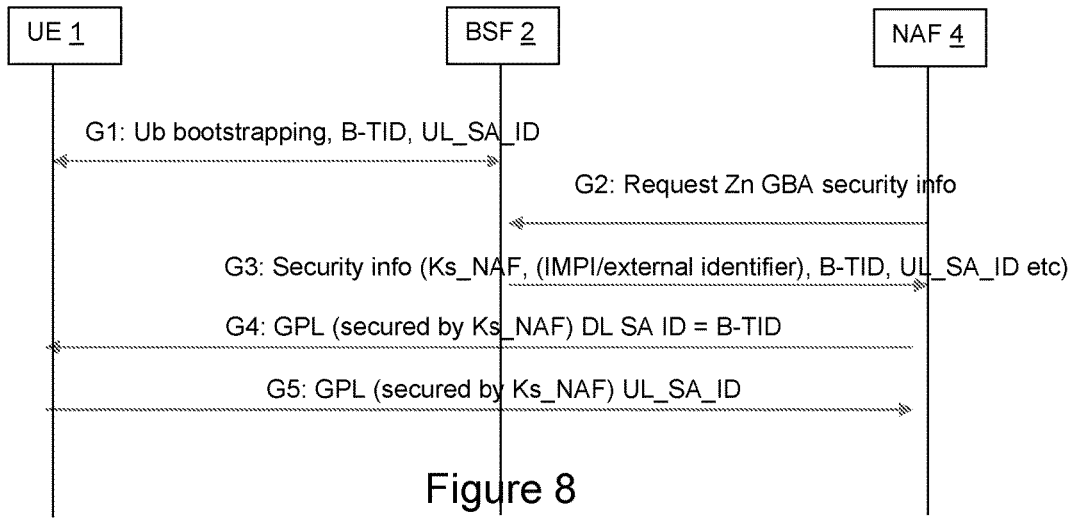
FIG. 8 is a signaling diagram showing an exemplary procedure for providing security associations in which a BSF pushes an encrypted B-TID to a UE and NAF.

FIG. 8 illustrates the BSF 2 pushing the allocated uplink security association identifier encrypted to the UE 1 and NAF 4. The following numbering corresponds to the numbering of FIG. 8:

G1: The UE 1 and BSF 2 perform bootstrapping on the Ub interface as described in TS 33.220. The BSF 2 allocates a new uplink security association identifier, and assigns the uplink security association identifier to the UE 1 over the Ub interface.

G2 and G3: The NAF 4 retrieves B-TID and the new allocated uplink security association identifier together with other security related information from the BSF 2, as described in embodiment 2 above with the extension of Zn protocol to allow the inclusion of the uplink security association identifier.

Or:

G3: The BSF 2 pushes the B-TID and the newly allocated uplink security association identifier together with other security related information to the NAF 4 as described in embodiment 1 above with the extension of Zn protocol to allow the inclusion of the uplink security association identifier (step G2 would then be obsolete).

G4: The NAF 4 sends end-to-end protected payload to UE 1 using the B-TID received from BSF 23, as the downlink security association identifier in GPL to the UE 1. Note that the NAF 4 will use a different B-TID format because the B-TID format in normal GBA TS 33.220 is different to the downlink security association identifier format in GBA Push TS 33.223.

G5: If the UE 1 needs to send uplink end-to-end protected payload to the NAF 4, then the UE 1 uses the new uplink security association identifier received on Ub interface from BSF 2 in GPL to identify the security association used to protect the payload to be sent to the NAF 4.

Note that there are a number of variants in this flow:
Either:
G2 and G3 take place (as described in embodiment 1 above); or
only G3 takes place (as described in embodiment 2 above), but not G2.
Step G4 does not need to take place prior to step G5.

Embodiment 4

In this embodiment the BSF 2 allocates the uplink security association identifier and provides this uplink security association identifier to the UE 1 over the Ub interface at bootstrapping phase in normal GBA. The GUSS for UE 1 may contain configuration regarding whether the UE 1 supports GPL capability. The UE 1 is able to send end-to-end protected payload in GPL to the NAF 4 as soon it has finalized the bootstrapping phase on Ub interface in normal GBA. When the UE 1 sends the end-to-end protected payload using GPL to the NAF 4, the UE 1 uses the uplink security association identifier allocated by the BSF towards NAF 4. The NAF 4 needs to contact the BSF 2, and provide the BSF 2 with the uplink security association identifier to retrieve the security information (e.g., Ks_NAF) from BSF 2 for this UE 1.

This embodiment is the same as embodiment 3 except that the NAF 4 requests the security context for the UE 1 that is using a certain uplink security association identifier.

Figure 9:
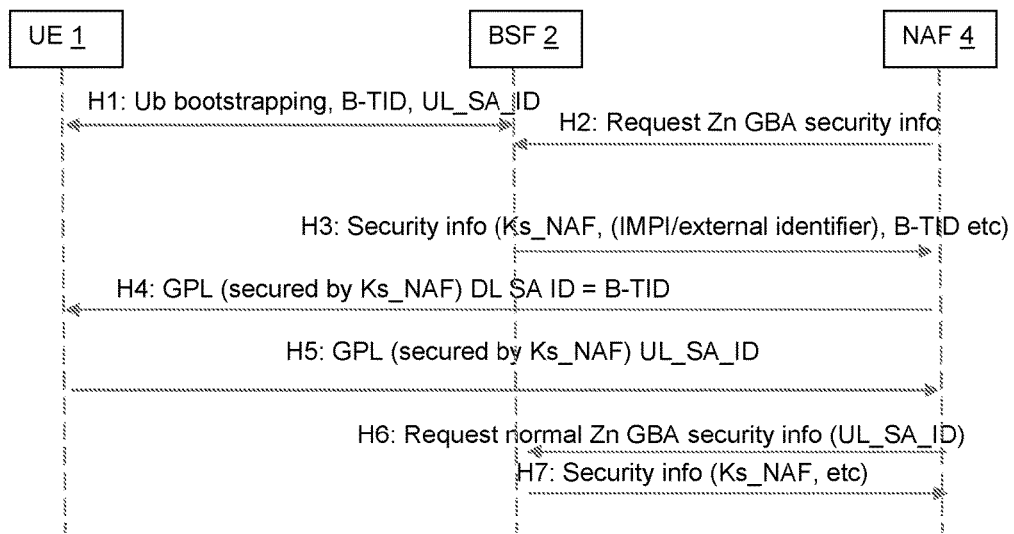
FIG. 9 is a signaling diagram showing an exemplary procedure for providing security associations in which a BSF pushes an encrypted B-TID to a UE and NAF.

In this embodiment the UE 1 could use either HTTPS or GPL or any other security protocol in steps H4 and H5, but the examples below show only GPL. FIG. 9 illustrates exemplary signaling, with the following numbering corresponding to that of FIG. 9:

H1: The UE 1 and BSF 2 perform bootstrapping on the Ub interface as described in TS 33.220. The BSF 2 allocates a new uplink security association identifier, and assigns the uplink security association identifier to the UE 1 over the Ub interface.

H2 and H3: The NAF 4 retrieves B-TID together with other security related information from the NAF 4, as described in embodiment 2 above.

Or;

H3: The BSF 2 pushes the B-TID together with other security related information to the NAF 4 as described in embodiment 1 above (step H2 would then be obsolete).

H4: The NAF 4 sends end-to-end protected payload to UE 1 using B-TID received from BSF 2 as downlink security association identifier in GPL to the UE 1. H5: If the UE 1 needs to send uplink end-to-end protected payload to the NAF 4, then the UE 1 uses the uplink security association identifier received on the Ub interface from the BSF 2 in GPL when protecting the payload to be sent to the NAF 4.

H6 and H7: The NAF 4 retrieves the security information related to the uplink security association identifier received in GPL from the UE 1 by contacting the NAF 4, as described in embodiment 2 above with the extension of Zn protocol to allow the inclusion of the uplink security association identifier.

Note that there are a number of variants in this sequence; H4 does not need to take place prior to H5, and either H2 and H3 take place (as described in embodiment 1 above), or only H3 above takes place (as described in embodiment 2 above) but not H2.

Embodiment 5

In this embodiment the BSF 2 allocates a uplink security association identifier embryo (e.g. a random number or some other at least statistically unique identity) and provides this uplink security association identifier embryo to the UE 1 over the Ub interface at bootstrapping phase in normal GBA. The same uplink security association identifier embryo is then provided by the BSF 2 to the NAFs communicating with this UE 1, together with other security information such as Ks-NAF 4, B-TID etc.

Both the UE 1 and NAF 4 compute the uplink security association identifier by inputting at least the uplink security association identifier embryo and some NAF 4-specific input, e.g., the NAF 4 name, into a one way function, e.g., a hash function, a pseudo random function or a key derivation function.

The UE 1 is able to send end-to-end protected payload in GPL to the NAF 4 as soon it has finalized the bootstrapping phase on Ub interface in normal GBA and has computed the uplink security association identifier.

The UE 1 will get full privacy protection for the uplink traffic as it uses a unique uplink security association identifier for every NAF 4. However, since each NAF 4 receives the uplink security association identifier embryo, any NAF 4 will be able to detect if the same UE 1 contacts two different other NAFs. A second drawback is that since the uplink security association identifier is derived using a one way function, the NAF 4 needs to reverse the received uplink security association identifier to find out which uplink security association identifier embryo it corresponds to (so that the NAF 4 can look up the security association). This reversal could for example be accomplished by the NAF 4 by computing the uplink security association identifier from the uplink security association identifier embryo and storing the security associations in a database indexed by the uplink security association identifier.

In this embodiment the UE 1 could use either HTTPS or GPL or any other security protocol in I4 and I6, but the examples below show only GPL.

Figure 10:
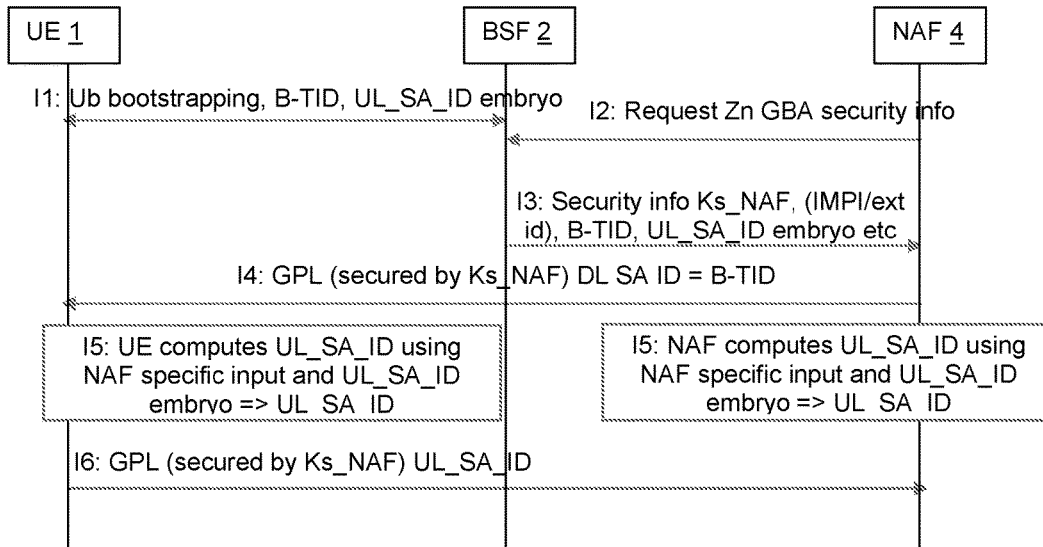
FIG. 10 is a signaling diagram showing an exemplary procedure for providing security associations in which a BSF pushes a P-TID embryo to a UE and NAF.

FIG. 10 shows exemplary signaling when the BSF 2 pushes a uplink security association identifier embryo to the UE 1 and the NAF 4. The following numbering corresponds to that of FIG. 10:

I1: The UE 1 and BSF 2 perform bootstrapping on the Ub interface as described in TS 33.220. The BSF 2 allocates a new uplink security association identifier embryo, and assigns the uplink security association identifier embryo to the UE 1 on the Ub interface.

I2 and I3: The NAF 4 retrieves B-TID and uplink security association identifier embryo together with other security related information from the NAF 4, as described in embodiment 2 above with the extension of Zn protocol to allow the inclusion of the uplink security association identifier embryo.

Or;

I3: The BSF 2 pushes the B-TID and uplink security association identifier embryo together with other security related information to the NAF 4 as described in embodiment 1 above with the extension of Zn protocol to allow the inclusion of the uplink security association identifier embryo (step 2 would then be obsolete).

I4: The NAF 4 sends end-to-end protected payload to the UE 1 using the B-TID, received from the BSF 2, as downlink security association identifier.

I5: UE 1 and NAF 4 compute the uplink security association identifier using a NAF 4 specific input and the uplink security association identifier embryo in order to get a new uplink security association identifier.

I6: If the UE 1 sends an uplink GPL packet to the NAF 4, then the UE 1 includes the newly computed uplink security association identifier.

Note that there are a number of variants in this flow: I4 does not need to take place prior to I6, and either I2 and I3 take place (as described in embodiment 1 above, or only I3 takes place (as described in embodiment 2 above, but not I2).

As described above, in normal legacy GBA, the UE 1 uses the same B-TID with all NAFs 4 it communicates with in GBA TS 33.220. An option in this embodiment is that the UE 1 and NAF 4 hash the B-TID with e.g. a common NAF 4 unique input to ensure that the UE 1 uses security association identifiers that are unique per NAF 4. The hashed B-TID is called B-TID' hereafter This hashing would take place in the UE 1 and NAF 4 before I4 in the flow above. If the NAF 4 and UE 1 uses HTTPS to communicate, they use B-TID' in place of B-TID as security association identifier. If the NAF 4 and the UE 1 uses GPL to communicate, the B-TID' replaces the B-TID in I4 above and the B-TID' would be used as the downlink security association identifier. An additional option would be to use the B-TID' as both the downlink and uplink security association identifiers in GPL. This option addresses issue 3 described above.

Embodiment 6

In this embodiment the BSF 2 allocates a uplink security association identifier embryo and provides the uplink security association identifier embryo to UE 1 on Ub interface at a bootstrapping phase in normal GBA. The same identical uplink security association identifier embryo is put through a one way function by the BSF 2 for each NAF 4 using a NAF 4 specific input to the one way function (the one way function could be e.g. a hash, a pseudo-random function or a key derivation function. The uplink security association identifier is then provided by the BSF 2 to respective NAF 4 with GPL capabilities together with other security information, e.g., Ks-NAF 4, B-TID etc.

The UE 1 calculates the uplink security association identifier using the same NAF 4 specific input to the calculation function as the BSF 2. This NAF 4 specific input needs to be known at the UE 1; it could for example be pre-configured or received from a web page. The input could comprise e.g., the NAF 4 name.

This is similar to embodiment 5, except that the calculation of the uplink security association identifier is now done in the BSF 2 and hence a NAF 4 can no longer detect if the same UE 1 connects to two different other NAFs (because it does not have access to the uplink security association identifier embryo).

In this embodiment the UE 1 could use either HTTPS or GPL or any other security protocol in J5 and J7, but the examples below show only GPL.

Figure 11:
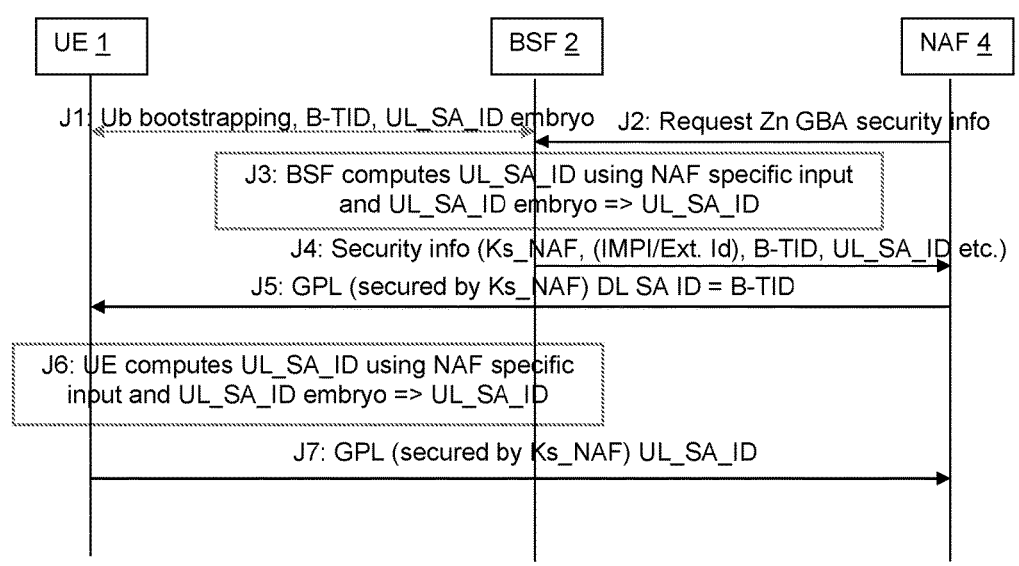
FIG. 11 is a signaling diagram showing an exemplary procedure for providing security associations in which a BSF pushes a P-TID embryo to a UE.

FIG. 11 shows exemplary signaling when the BSF 2 pushes the allocated uplink security association identifier embryo to the UE 1. The following numbering corresponds to that of FIG. 11:

J1: The UE 1 and BSF 2 perform bootstrapping on the Ub interface as described in TS 33.220. The BSF 2 allocates a new uplink security association identifier embryo, and assigns the uplink security association identifier embryo to the UE 1 over the Ub interface.

J2, J3 and J4: The NAF 4 retrieves B-TID and uplink security association identifier together with other security related information from the NAF 4, as described in embodiment 2 above with the extension of Zn protocol to allow the inclusion of the uplink security association identifier.

J3: The BSF 2 computes the uplink security association identifier using a NAF 4 specific input and the uplink security association identifier embryo.

Or;

J3 and J4: The BSF 2 pushes the B-TID and uplink security association identifier together with other security related information to the NAF 4 as described in embodiment 1 above with the extension of Zn protocol to allow the inclusion of the uplink security association identifier (J2 is then obsolete).

J5: The NAF 4 sends end-to-end protected payload to UE 1 using the B-TID received from BSF 2 in GPL to the UE 1. J6: The UE 1 computes the uplink security association identifier using a NAF 4 specific input and the uplink security association identifier embryo received on the Ub interface from BSF 2 in the same way as the BSF 2 in step J3.

J7: When the UE 1 sends a GPL packet to the NAF 4 it includes the newly computed uplink security association identifier in the packet Note that there are a number of variants in this flow: J5 does not need to take place prior to J7, and either J2, J3 and J4 take place, or only J3 and J4 take place, but not J2.

In a further option, as described above, in normal legacy GBA today the UE 1 uses the same B-TID with all NAFs it communicates with in GBA TS 33.220. An option to improve security in this example is that the UE 1 and NAF 4 hashes the B-TID with e.g. some common NAF 4 unique input to ensure that the UE 1 uses one unique B-TID value i.e. B-TID', with each NAF 4. This would take place in the UE 1 and NAF 4 before J5 in the flow above. This B-TID' would replace the B-TID in the UE 1-NAF 4 communication using either HTTPS or GPL, after normal GBA has taken place. In HTTPS, the B-TID' replaces the B-TID. In GPL, the B-TID' replaces the B-TID in J5 above and the B-TID' is used as the downlink security association identifier in GPL. An additional option would be to use the B-TID' as both the downlink and uplink security association identifier in GPL. This option addresses issue 3 above.

Embodiment 7

In this embodiment the BSF 2 allocates one unique uplink security association identifier for the UE 1 to use with every NAF 4 and provides all the allocated uplink security association identifiers to UE 1 on Ub interface at bootstrapping phase in normal GBA. Every uplink security association identifier is then provided by the BSF 2 to respective NAF 4 with GPL capabilities together with other security information as Ks-NAF 4, B-TID etc.

The UE 1 receives and stores all the different uplink security association identifier to be used with each corresponding NAF 4. Some NAF 4 identity needs to be sent together with each uplink security association identifier to the UE 1, in order for the UE 1 to identify which P-TID to use with each NAF 4.

This embodiment is essentially the same as embodiment 6 except that instead of computing the NAF 4 specific uplink security association identifiers, the BSF provides the values to the UE 1. It trades processing for transmission overhead.

This embodiment implies that the BSF 2 needs to provide the UE 1 with all the uplink security association identifiers that the UE 1 may want to contact in the future. Another option is that the Ub interface is enhanced so that the UE 1 can request uplink security association identifiers for other NAFs as needed.

In this embodiment the UE 1 could use either HTTPS or GPL or any other security protocol in K4 and K5, but the examples below show only GPL.

Figure 12:
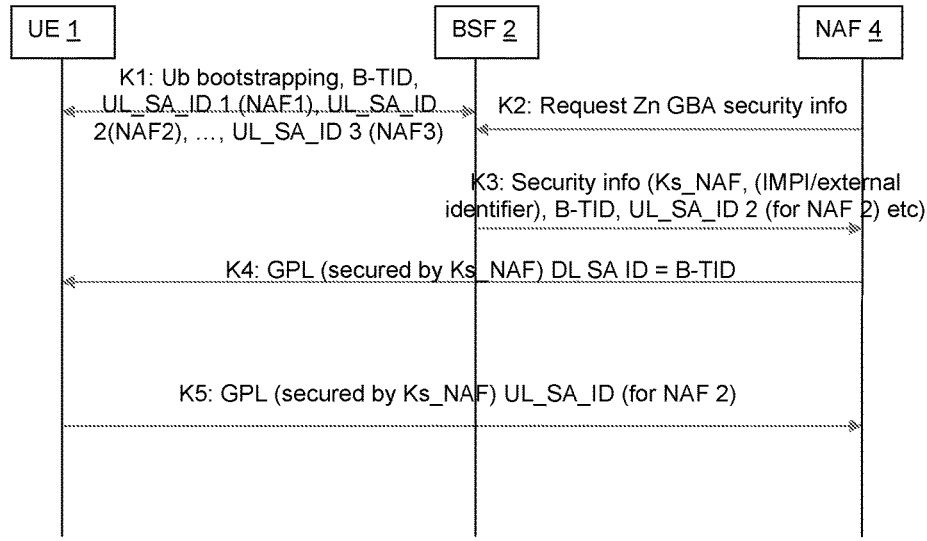
FIG. 12 is a signaling diagram showing an exemplary procedure for providing security associations in which a BSF pushes a P-TID to a UE and each NAF.

FIG. 12 shows exemplary signaling where the BSF 2 pushes the allocated uplink security association identifier, one for each NAF 4, to the UE 1 and to each NAF 4. The following numbering corresponds to that of FIG. 12:

K1: The UE 1 and BSF 2 perform bootstrapping on the Ub interface as described in TS 33.220. The BSF 2 allocates or computes a new uplink security association identifier for each NAF 4 with GPL capability the UE 1 intends to communicate with, and assigns the list of uplink security association identifiers to the UE 1 on the Ub interface.

K2 and K3: The NAF 4 retrieves B-TID and uplink security association identifier together with other security related information from the NAF 4, as described in embodiment 2 above with the extension of Zn protocol to allow the inclusion of the uplink security association identifier.

Or;

K3: The BSF 2 pushes the B-TID and allocated uplink security association identifier together with other security related information to the NAF 4 as described in embodiment 1 above with the extension of Zn protocol to allow the inclusion of the uplink security association identifier (K2 is then obsolete).

K4: The NAF 4 sends end-to-end protected payload to UE 1 using B-TID received from BSF 2 in GPL to UE 1. K5: When the UE 1 sends a GPL packet to the NAF 4 it includes the newly computed uplink security association identifier in the packet.

Note that there are a number of variants in this flow: K4 does not need to take place prior to K5, and either K2 and K3 take place or only K3 takes place, but not K2.

Embodiment 8

In this embodiment the NAF 4 allocates an uplink security association identifier and pushes it down to the UE 1 encrypted in GPL. This push needs to take place prior to the UE 1 being able to initiate uplink traffic end-to-end protected with GPL, due to UE 1 having no uplink security association identifier until NAF 4 has performed the push. This solution requires an extension of GPL protocol in TS 33.224 to carry the uplink security association identifier encrypted. In this embodiment the UE 1 could use either HTTPS or GPL or any other security protocol, but the examples below show only GPL.

Figure 13:
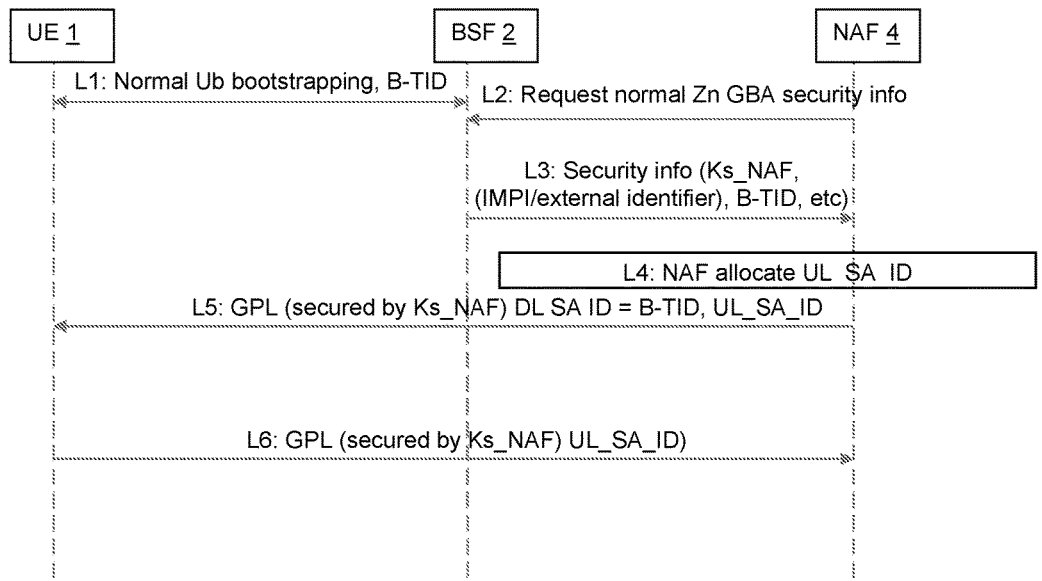
FIG. 13 is a signaling diagram showing an exemplary procedure for providing security associations in which a BSF pushes a P-TID to a UE in GPL.

FIG. 13 shows exemplary signaling where the NAF pushes the allocated P-TID to the UE in GPL. The following numbering corresponds to that of FIG. 13:

L1: The UE 1 and BSF 2 perform bootstrapping on the Ub interface as described in TS 33.220.

L2 and L3: The NAF 4 retrieves B-TID together with other security related information from the NAF 4, as described in embodiment 2 above.

Or;

L3: The BSF 2 pushes the B-TID together with other security related information to the NAF 4 as described in embodiment 1 above (L2 is then obsolete).

L4: The NAF 4 allocates the uplink security association identifier.

L5: The NAF 4 optionally encrypts and pushes down the uplink security association identifier to the UE 1 in GPL. This step needs to take place prior to UE 1 being able to send any end-to-end protected payload using GPL to the NAF 4.

L6: When the UE 1 sends a GPL packet to the NAF 4 it includes the newly computed uplink security association identifier in the packet. The NAF 4 retrieves the security association from its database of security associations without having to contact the BSF 2.

Embodiment 9

In this embodiment, the UE 1 and NAF 4 perform bootstrapping on the Ub interface as described in TS 33.220. The NAF 4 allocates the uplink security association identifier. The UE 1 contacts the NAF 4 in order to retrieve the generated uplink security association identifier from the NAF 4 by initiating a end-to-end protected payload using GPL and using the B-TID as uplink security association identifier in GPL message. Note that the UE 1 will use a different B-TID format in GPL now because the B-TID format in normal GBA TS 33.220 is different to the downlink security association identifier format in GBA Push TS 33.223.

The NAF 4 allocates the generated uplink security association identifier to the UE 1 and includes it in the response to the UE 1 together with the B-TID, used as the downlink security association identifier, in order to command the UE 1 to stop using the B-TID as uplink security association identifier and start using the generated uplink security association identifier for uplink traffic.

The generated uplink security association identifier may have been generated by the NAF 4, as described above, or it may have been generated in the BSF 2 and provided to the NAF 4 in the response on the Zn interface. The latter version of this example is not shown in the FIG. 14. In this example the UE 1 could use either HTTPS or GPL or any other security protocol, but the examples below show only GPL.

Figure 14:
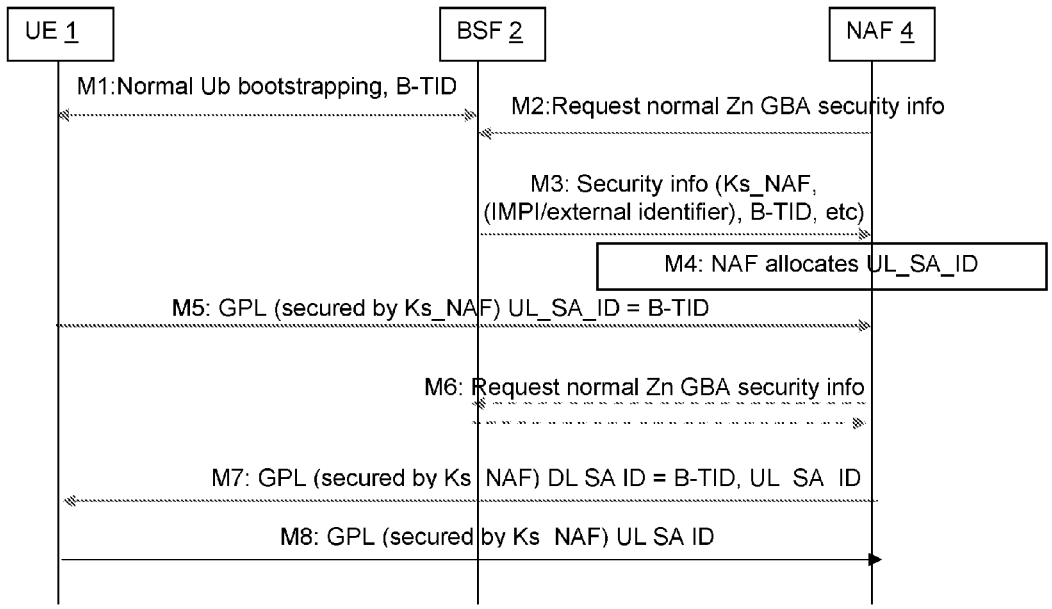
FIG. 14 is a signaling diagram showing an exemplary procedure for providing security associations in which a NAF allocates a P-TID.

FIG. 14 shows exemplary signaling where the UE 1 uses B-TID as uplink security association identifier when sending GPL messages to the NAF 4, in order to retrieve the generated uplink security association identifier. The following numbering corresponds to that of FIG. 14.

M1: The UE 1 and BSF 2 perform bootstrapping on the Ub interface as described in TS 33.220.

M2 and M3: The NAF 4 retrieves B-TID together with other security related information from the NAF 4, as described in embodiment 2 above.

Or;

M3: The BSF 2 pushes the B-TID together with other security related information to the NAF 4 as described in embodiment 1 above (step M2 is then obsolete).

M4: The NAF 4 allocates the uplink security association identifier.

M5: If the UE 1 wants to take advantage of the privacy enhancement, it needs to retrieve the generated uplink security association identifier from the NAF 4. The UE 1 sends an end-to-end protected payload with GPL using the B-TID as the uplink security association identifier in order to retrieve the generated uplink security association identifier from the NAF 4. M6: If the NAF 4 has no security information related to this B-TID when it receives the GPL protected payload from the UE 1, because M2 and M3 have not taken place, the NAF 4 could as an alternative contact the BSF 2 with the B-TID to retrieve the security information related to B-TID.

M7: The NAF 4 includes the generated uplink security association identifier in the response to the UE 1.

M8: If the UE 1 needs to send further uplink end-to-end protected payloads to the NAF 4, then the UE 1 uses the generated uplink security association identifier from now on. Note that if the NAF 4 needs to push end-to-end protected payload to the UE 1, then the NAF 4 takes the B-TID received from BSF 2 and uses it as the downlink security association identifier in GPL, and protects the payload to be sent to the UE 1. This is not shown in FIG. 14.

Note that there are a number of variants in this flow: M6 can only take place if step M5 has taken place. M4 does not need to take place before M5, but can take place at a later time e.g. after M5 or M6. Furthermore, either M2 and M3 take place but not M6, or M3 takes place (as described in embodiment 2 above), but not M2 and M6, or M6 takes place in the flow above, but not M2 and M3.

Embodiment 10

In this embodiment, the UE 1 and BSF 2 perform bootstrapping on the Ub interface as described in TS 33.220. The NAF 4 allocates the uplink security association identifier.

The UE 1 contacts the NAF 4 in order to retrieve the generated uplink security association identifier from the NAF 4 by initiating a HTTPS Request with the B-TID received on the Ub interface from the BSF 2 to the NAF 4. The NAF 4 allocates the uplink security association identifier and includes it in the HTTP Response to the UE 1.

The generated uplink security association identifier may have been generated by the NAF 4 itself as described above, or it may have been generated in the BSF 2 and provided to the NAF 4 in the response on the Zn interface. The latter version of this example is not shown in FIG. 15. In this example the UE 1 could use either HTTPS or GPL or any other security protocol, but the examples below show only HTTPS.

Figure 15:
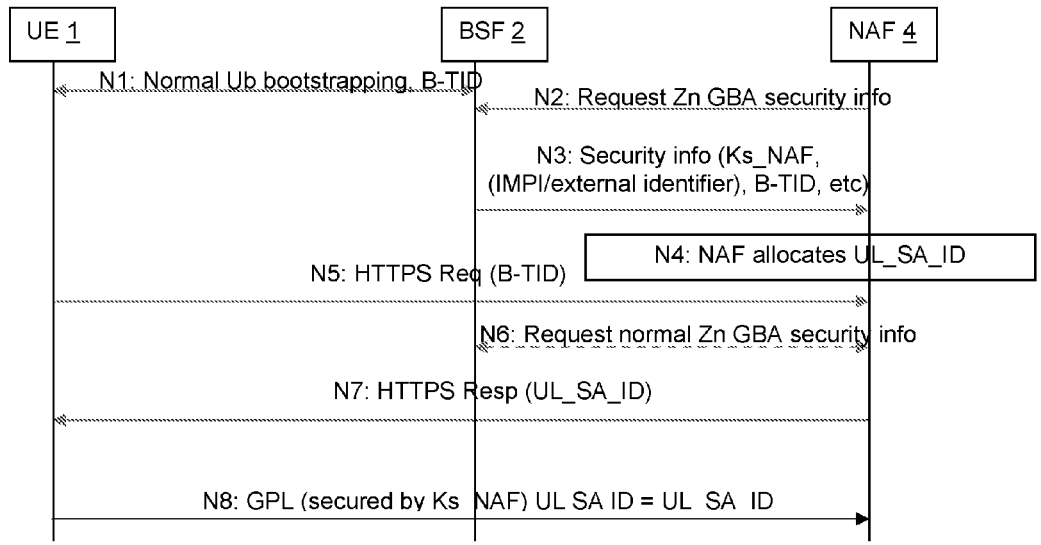
FIG. 15 is a signaling diagram showing an alternative exemplary procedure for providing security associations in which a NAF allocates a P-TID.

FIG. 15 shows exemplary signaling where the UE 1 retrieves the generated uplink security association identifier from the NAF 4. The following numbering corresponds to that of FIG. 15:

N1: The UE 1 and BSF 2 perform bootstrapping on the Ub interface as described in TS 33.220.

N2 and N3: The NAF 4 retrieves B-TID together with other security related information from the NAF 4, as described in embodiment 2 above.

Or;

N3: The BSF 2 pushes the B-TID together with other security related information to the NAF 4 as described in embodiment 1 above (step N2 is obsolete).

N4: The NAF 4 allocates the uplink security association identifier.

N5: If the UE 1 needs to send end-to-end protected payload to the NAF 4, then the UE 1 retrieves the generated uplink security association identifier from the NAF 4 using HTTPS before it can use GPL for protection of uplink payload. Therefore the UE 1 initiates a HTTPS Request with the B-TID to the NAF 4. N6: If the NAF 4 has no security information related to this B-TID when it receives the HTTPS Request with B-TID from the UE 1 in N5 (because to N2 and N3 have not taken place), the NAF 4 could as a new option contact the BSF 2 with the B-TID.

N7: The NAF 4 includes the generated uplink security association identifier to the UE 1 in HTTPS Response.

N8: When the UE 1 sends a GPL packet to the NAF 4 it includes the generated uplink security association identifier in the packet.

Note that if the NAF 4 needs to push end-to-end protected payload to the UE 1, then the NAF 4 takes B-TID received from BSF 2 and uses it as the downlink security association identifier in GPL, and protects the payload to be sent to the UE 1. This is not shown in FIG. 15.

Note that there are a number of variants in this flow: N6 can only take place if N5 has taken place. N4 does not need to take place before N5. N4 can take place at a later time e.g. after N5 or after N6. Furthermore, either N2 and N3 take place but not N6, or only N3 above takes place (as described in embodiment 2 above), but not N2 and N6, or N6 takes place in the flow above, but not N2 and N3.

Embodiment 11

In this embodiment, the B-TID is used as the uplink security association identifier. This, however, leaks the information that the same UE 1 connects to multiple NAFs unless the UE 1 re-bootstraps between the connection attempts. In this embodiment, privacy is close to normal GBA i.e. in normal GBA where the UE 1 uses the same B-TID with all communicating NAFs 4. In this embodiment the UE 1 could use either HTTPS or GPL or any other security protocol, but the examples below show only GPL.

Figure 16:
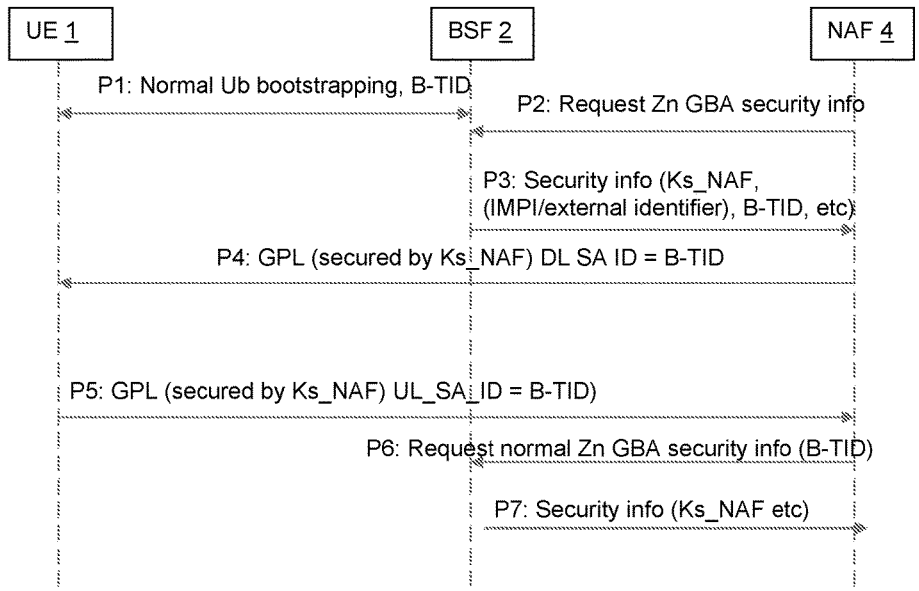
FIG. 16 is a signaling diagram showing an exemplary procedure for providing security associations in which a UE uses B-TID.

FIG. 16 shows exemplary signaling where the UE 1 uses B-TID as uplink security association identifier when UE 1 and NAF 4 communicate. The following numbering corresponds to that of FIG. 16:

P1: The UE 1 and BSF 2 perform bootstrapping on the Ub interface as described in TS 33.220.

P2 and P3: The NAF 4 could retrieve B-TID together with other security related information from the NAF 4 as described in embodiment 2 above.

Or;

P3: The BSF 2 could push the B-TID together with other security related information to the NAF 4 as described in embodiment 1 above (P2 is then obsolete).

P4: If the NAF 4 needs to push end-to-end protected payload to the UE 1, then the NAF 4 takes the B-TID received from BSF 2 and uses it as the downlink security association identifier (DL_SA_ID) in GPL, and protects the payload to be sent to the UE 1. P5: If the UE 1 needs to send uplink end-to-end protected payload to the NAF 4, then the UE 1 uses B-TID as the uplink security association identifier in GPL, and protects the payload to be sent to the NAF 4.

P6: If the NAF 4 has no security information related to this B-TID when it receives a GPL protected payload (i.e. P2 and P3 has not taken place), the NAF 4 could as a third option contact the BSF 2 with the B-TID.

P7: If P6 has taken place then P7 takes place as well. The BSF 2 responds with the security information identified by B-TID to the NAF 4.

Note that there are a number of variants in this flow: P6 and P7 only take place if P5 has taken place. P4 does not need to take place before P5. P4 can take place after P5. Furthermore, either P2 and P3 take place (as described in embodiment 1 above), but not P6 and P7, or only P3 takes place (as described in embodiment 2 above), but not P2 and P6 and P7, or P6 and P7 take place in the flow above, but not P2 and P3.

Embodiment 12

In this embodiment, the UE 1 and BSF 2 perform bootstrapping on the Ub interface as described in TS 33.220. The NAF 4 (or BSF 2) computes a one-way function (e.g., a hash or key derivation function) with at least the B-TID and Ks_NAF 4 as input and the output is assigned to the uplink security association identifier.

There are two options how the UE 1 could retrieve the same P-TID:

The UE 1 could either trigger the NAF 4 to perform the calculation of the uplink security association identifier and then the UE 1 could locally perform the same calculation without waiting for any response from the NAF 4. Or;

The UE 1 could trigger the NAF 4 to perform the calculation of the uplink security association identifier and wait for a response where the NAF 4 has included the uplink security association identifier in the response to the UE 1.

In this embodiment the UE 1 could use either HTTPS or GPL or any other security protocol, but the examples below show only HTTPS and GPL.

Figure 17:
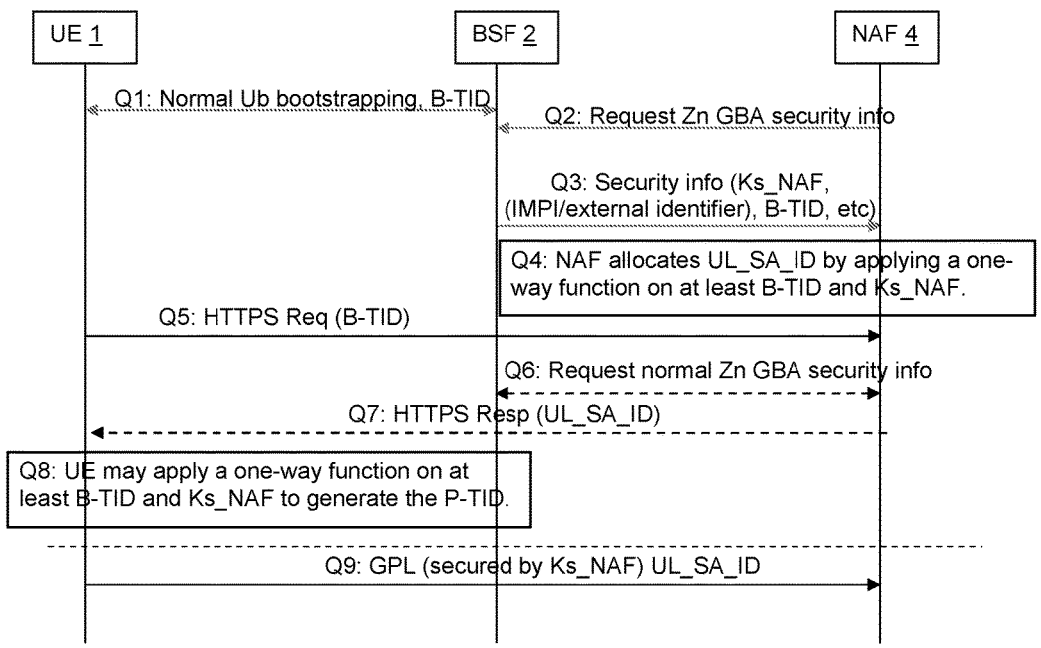
FIG. 17 is a signaling diagram showing an exemplary procedure for providing security associations in which a NAF allocates a P-TID using a B-TID.

HTTPS:

In the signaling illustrated in FIG. 17, the UE 1 retrieves the generated uplink security association identifier from the NAF 4 by initiating a HTTPS Request with the B-TID received from the BSF 2 on the Ub interface, to the NAF 4. The NAF 4 includes the generated uplink security association identifier in the HTTP Response to the UE 1. The generated uplink security association identifier may have been generated by the NAF 4 itself, or it may have been generated in the BSF 2 and provided to the NAF 4 in the response on the Zn interface. The latter version of this example is not shown in FIG. 21.

As an option, the UE 1 also sends a HTTPS Request with the B-TID as a trigger to the NAF 4 without expecting any HTTP Response from the NAF 4, and the UE 1 then performs the calculation of the uplink security association identifier locally in the ME in the same way as the NAF 4.

FIG. 17 shows exemplary signaling for the UE 1 to retrieve the generated uplink security association identifier from NAF 4 in HTTPS.

Q1: The UE 1 and BSF 2 perform bootstrapping on the Ub interface as described in TS 33.220.

Q2 and Q3: The NAF 4 retrieves B-TID together with other security related information from the NAF 4, as described in embodiment 2 above.

Or;

Q3: The BSF 2 pushes the B-TID together with other security related information to the NAF 4 as described in embodiment 1 above (Q2 is then obsolete).

Q4: The NAF 4 allocates the uplink security association identifier by performing a hash of B-TID by using the Ks_NAF 4 as input to the one-way function.

Q5: If the UE 1 needs to send end-to-end protected payload to the NAF 4 using GPL, then the UE 1 retrieves the generated uplink security association identifier from the NAF 4 using HTTPS before it can use GPL for protection of uplink payload. Therefore the UE 1 initiates a HTTPS Request with the B-TID to the NAF 4.

Q6: If the NAF 4 has no security information related to this B-TID when it receives the HTTPS Request with B-TID from the UE 1 in Q5 (due to Q2 and Q3 having not taken place), the NAF 4 could as a new option contact the BSF 2 with the B-TID.

Q7: If the NAF 4 responds to the UE 1 then the NAF 4 includes the uplink security association identifier to the UE 1 in HTTPS Response.

Q8: If the UE 1 does not receive or expect any response from the NAF 4, then the UE 1 generates the uplink security association identifier by applying the one-way function to at least B-TID and Ks_NAF 4.

Q9: When the UE 1 sends a GPL packet to the NAF 4 it includes the generated uplink security association identifier in the packet.

Note that if the NAF 4 needs to push end-to-end protected payload to the UE 1, then the NAF 4 takes the B-TID received from BSF 2, uses the B-TID as downlink security association identifier in GPL packets sent to the UE 1. This is not shown in FIG. 17. Note that there are a number of variants in this flow: Q6 can only take place if Q5 has taken place. Q4 does not need to take place before Q5. Q4 can take place at a later time e.g. after Q5 or after Q6. Furthermore, either Q2 and Q3 take place, but not Q6, or only Q3 takes place (as described in embodiment 2 above), but not Q2 and Q6, or Q6 takes place in the flow above, but not Q2 and Q3. Q7 does not need to take place. If the UE 1 does not receive the response in Q7 then the UE 1 will in Q8 apply the same one-way function to at least the B-TID as the NAF 4 in Q4. Q5 would then work as a trigger from the UE 1 to the NAF 4 to request the NAF 4 to hash the B-TID in order to allocate a P-TID.

As an option the BSF 2 allocates the uplink security association identifier by applying a one-way function to at least the B-TID instead of the NAF 4 by using Ks_NAF 4 as input. The BSF 2 then needs to include the generated uplink security association identifier in the message to the NAF 4 in step Q3.

It will be appreciated that HTTPS in the embodiment of FIG. 17 can be replaced by GPL. All the steps as described above for the HTTPS case would apply in the GPL case as well apart from Q5 to Q8 which could be replaced by the following steps:

Qa5: If the UE 1 needs to send end-to-end protected payload to the NAF 4 using GPL, then the UE 1 needs to retrieve the generated uplink security association identifier from the NAF 4. The UE 1 could use the B-TID as the uplink security association identifier in GPL when it contacting the NAF 4 to retrieve the generated uplink security association identifier.

Qa6: If the NAF 4 has no security information related to this B-TID when it receives the GPL protected payload with B-TID from the UE 1 in step 5 (due to Q2 and Q3 having not taken place), the NAF 4 could as a new option contact the BSF 2 with the B-TID.

Qa7: The NAF 4 includes the generated uplink security association identifier and the B-TID in the message to the UE 1. This would require an extension of GPL header.

Qa8: If the UE 1 does not receive any response in step 7 from NAF 4, then the UE 1 allocates the uplink security association identifier by performing a hash of B-TID by using the Ks_NAF 4 as input to the hash function, in the same way as NAF 4.

Figure 18:
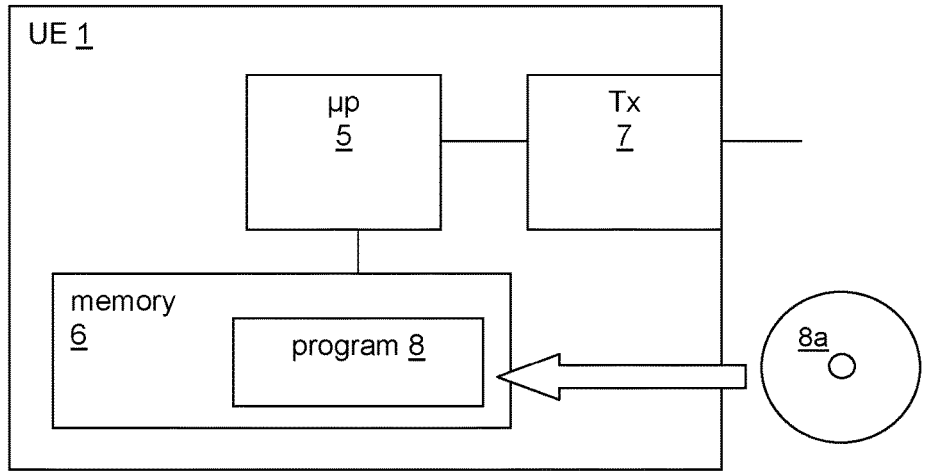
FIG. 18 illustrates schematically in a block diagram an exemplary UE.

Turning now to FIG. 18 herein, there is illustrated an exemplary UE 1, although it will be appreciated that this may be any type of client device. The UE 1 is provided with a processor 5 for determining that no SAs between the UE 1 and the NAF 4 are locally available to the UE 1. A computer readable medium in the form of a memory 6 is provided for storing an identifier embryo is provided, and the processor is arranged to construct an SA identifier using the identifier embryo. A transmitter 7 is also provided for sending a payload towards the NAF 4, the payload being protected using an SA associated with the constructed identifier. The processor 5, in some exemplary embodiments described above, is further arranged to calculate a uplink security association identifier by performing a one-way function on an uplink security association identifier embryo and a value known to both the client device and the NAF 4.

The memory 6 may also be used to store a computer program 8 which, when executed by the processor 5, causes the UE 1 to behave as described above. Note that the program may be obtained from a remote source 8*a*, such as a data carrier.

Figure 19:
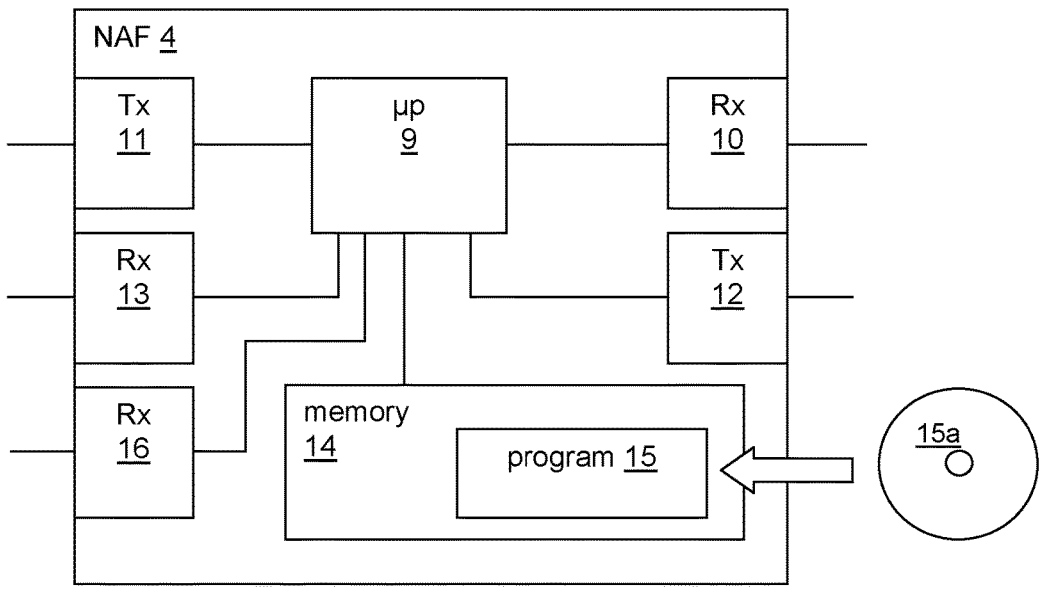
FIG. 19 illustrates schematically in a block diagram an exemplary Network Application Function node.

FIG. 19 illustrates a NAF 4 according to exemplary embodiments. The NAF 4 is provided with a processor 9 arranged to determine that no SA identifiers between the UE 1 and the NAF 4 are locally available. A receiver 10 is also provided for obtaining an identifier embryo from the BSF 2. The processor is further arranged to construct an SA identifier using the identifier embryo. A transmitter 11 is provided for sending to the UE 1 payload data protected using an SA associated with the constructed identifier.

In certain embodiments, the NAF 4 is provided with a second transmitter 12 arranged to send a request message to the BSF 2, the request message including a request for the identifier embryo.

In an exemplary embodiment, the processor 9 is further arranged to calculate an uplink security association identifier by performing a one-way function on an uplink security association identifier embryo and a value known to both the UE 1 and the NAF 4.

The NAF may, in exemplary embodiments, be provided with a second receiver 13 for, prior to sending the calculated uplink security association identifier to the UE 1, receiving a request for the P-TID from the UE 1.

A memory 14 is also provided for storing a computer program 15 which, when executed by the processor 9, causes the NAF 2 to behave as described above. Note that the program may be obtained from a remote source 15*a*, such as a data carrier.

A third receiver 16 is also provided for receiving payload data from the UE 1 protected using the second SA.

Figure 20:
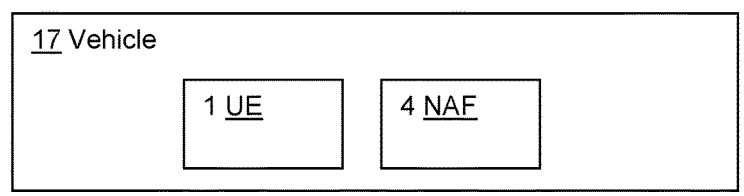
FIG. 20 illustrates schematically in a block diagram a vessel or vehicle.

Referring to FIG. 20, there is illustrated schematically a vehicle or vessel 17. The vehicle or vessel 17 is provided with either a UE 1, a NAF 2, or both a UE 1 and a NAF 4 as described above, or a computer device that performs the functions of any of a UE 1 or a NAF 4. Examples of vehicles and vessels include a ship, an aeroplane, a train, a truck and a car, but it will be appreciated that this includes any type of vehicle or vessel.

The techniques and examples described above enable GPL to be used with security associations established with a normal GBA bootstrapping in GBA in TS 33.220. This addresses the issue of how the UE 1 and a push NAF 4 allocate or assign the identifiers of the security associations to be used for uplink and downlink protected payload using GPL, in order for the UE 1 and push NAF 4 to identify the used security association in GPL.

The techniques also reduce the usage of authentication vectors (AV's) in the network, as the push NAF 4 does not need to initiate a new GBA Push with the BSF 2 and UE 1 but instead can re-use already established security associations established between UE 1 and BSF 2 in normal GBA in TS 33.220, if the push NAF 4 wants to push end-to-end protected data to the UE 1 (i.e. the network does not need to initiate a new AKA with the USIM in the UE 1).

The techniques described above also enables the UE 1 to use GPL to protect payload to be sent uplink to the NAF 4, if the UE 1 already has performed a bootstrapping on Ub interface with BSF 2 in normal GBA in TS 33.220. This is not feasible with existing techniques because the UE 1 can only use HTTPS like protocol with TLS together with normal GBA.

The techniques also enhance User privacy for uplink and downlink traffic with a NAF 4, when security associations have been established with normal GBA in TS 33.220.

The skilled person will appreciate that various modifications may be made to the above described embodiments. For example, many different examples are provided above.

It will be appreciated that in some circumstances, combinations of those examples may be used.

The following references have been used in this specification.

3GPP TS 33.220, ver 11.4.0 (Sep. 19, 2012): "Generic Authentication Architecture (GAA); Generic bootstrapping architecture", Sections 1 to 5

3GPP TS 33.223, ver 11.0.0 (Sep. 19, 2012): "Generic Authentication Architecture (GAA); Generic bootstrapping architecture: Push Function"

3GPP TS 33.224, ver 11.4.0 (Sep. 19, 2012) "Generic Authentication Architecture (GAA); Generic Bootstrapping Architecture (GBA) Push Layer"

Figure 1:
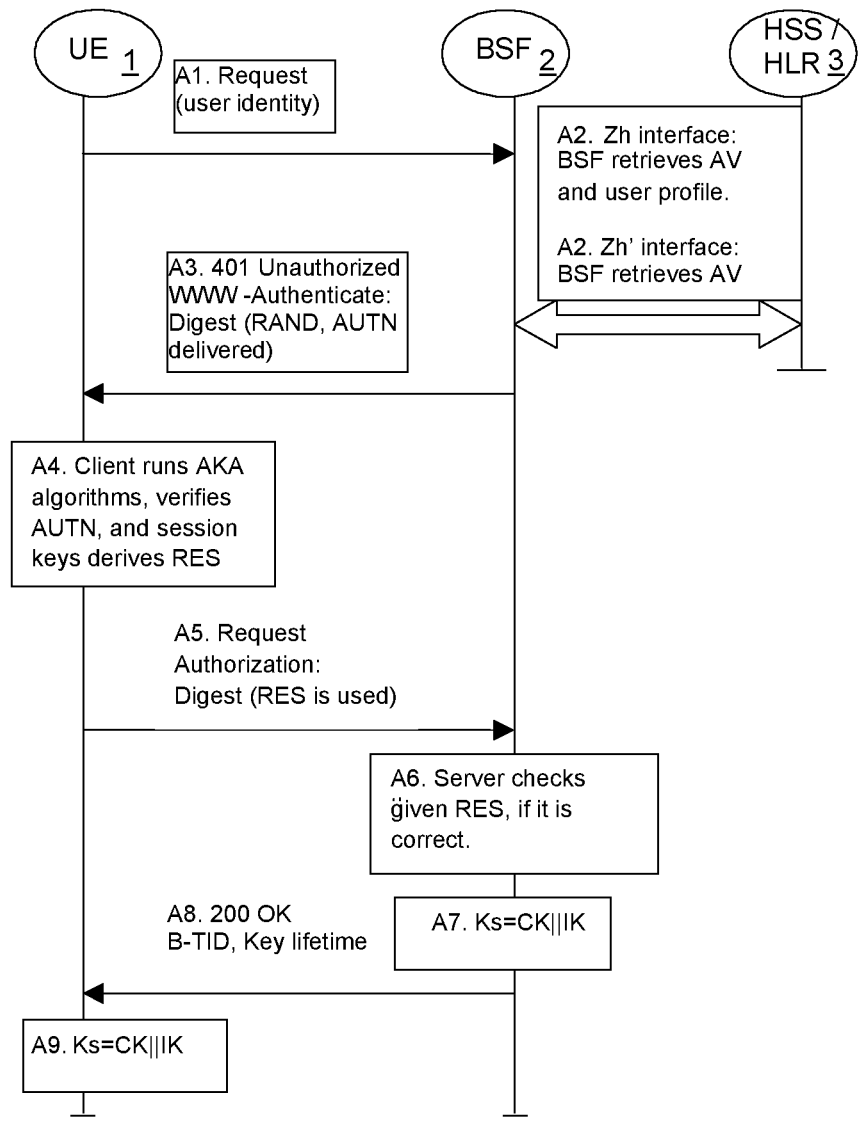
FIG. 1 is a signaling diagram illustrating an exemplary bootstrapping procedure.
Figure 2:
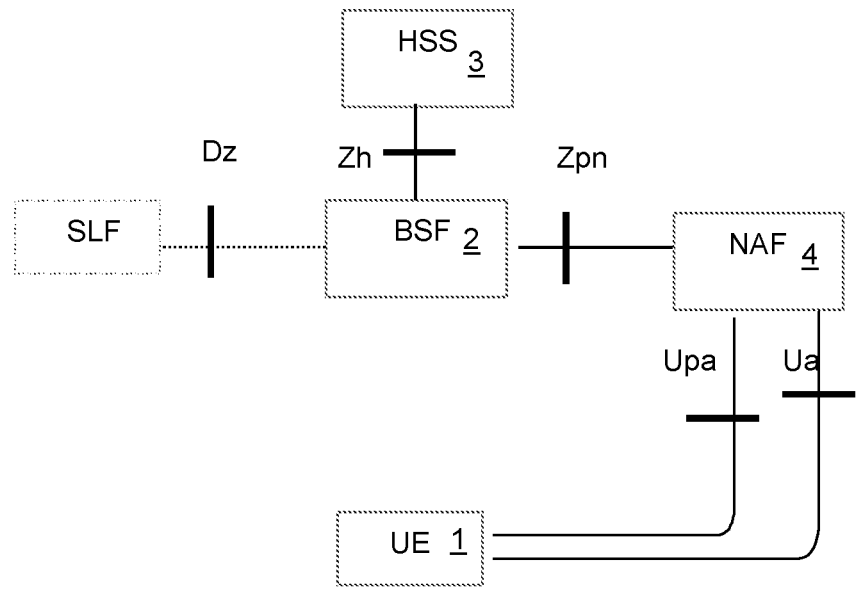
FIG. 2 illustrates schematically in a block diagram an exemplary architecture for a pushed bootstrapping procedure.
Figure 3:
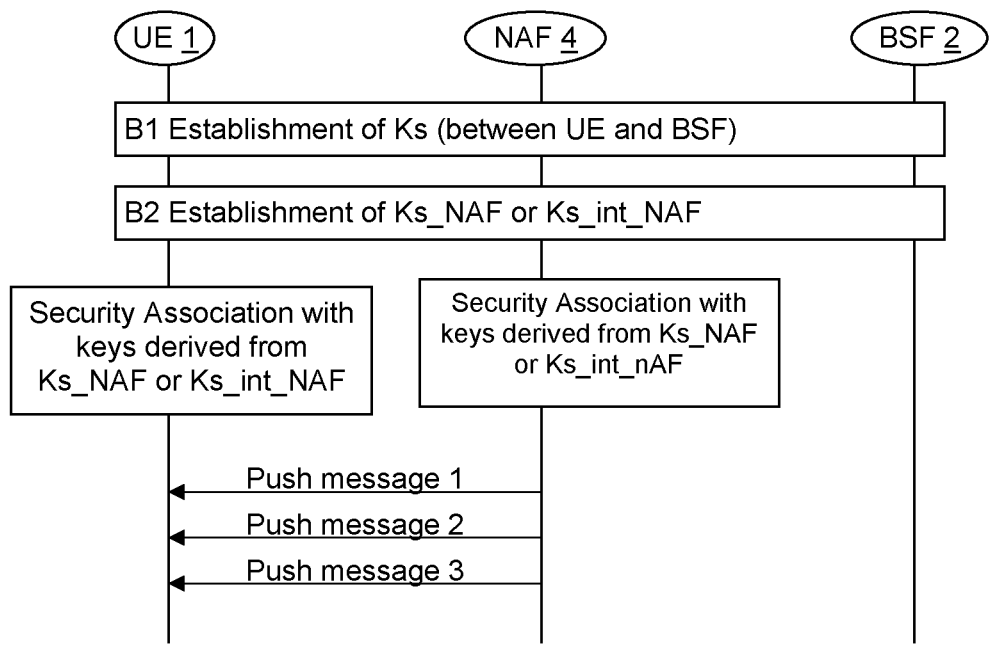
FIG. 3 is a signaling diagram showing establishment of a secure session using a pushed architecture.

3GPP TR 33.868 V0.10.0 (Sep. 19, 2012) "Security aspects of Machine-Type and other Mobile Data Applications Communications Enhancements", Section 4, FIG. 1

The following abbreviations have been used in this specification:

AKA Authentication and Key Agreement
AV Authentication Vectors
BSF Bootstrapping Server Function
B-TID Bootstrapping Transaction Identifier
DL_SA_ID Downlink security association identifier
GAA Generic Authentication Architecture
GBA Generic Bootstrapping Architecture
GPI GBA-Push-Info
GPL Generic Push Layer
GUSS GBA User Security Setting
HLR Home Location Register
HSS Home Subscriber Server HTTPS Hyper Text Transfer Protocol (Secure)
ISIM IP Multimedia Services Identity Module
M2M Machine to machine
MBMS Multimedia Broadcast Multicast Service
ME Mobile Equipment
MTC Machine Type Communication
NAF Network Application Function
NAI Network Access Identifier
P-TID Push Temporary Identifier
SA Security Associations
SIM Subscriber Identity Module
SMS Short Message Service
TrE Trusted Execution Environment
UE User Equipment
UL_SA_ID Uplink security association identifierUSIM Universal Subscriber Identity Module
UICC Universal Integrated Circuit Card

The invention claimed is:

1. A method of protecting a payload sent between a client device and a Network Application Function node in a communications network, the method comprising:
at one of the client device and the Network Application Function node,
determining that no existing Security Association identifier between the client device and the Network Application Function node is locally available;
obtaining an identifier embryo;
constructing a Security Association identifier using the identifier embryo; and
protecting a payload sent between the client device and the Network Application Function node using a Security Association associated with the constructed Security Association identifier, wherein
the identifier embryo includes a Push Temporary Identifier (P-TID) embryo, the method comprising the client device and the Network Application Function node independently calculating a P-TID by performing a one-way function on the P-TID embryo and a value known to both the client device and the Network Application Function node.

2. The method according to claim 1, wherein the protected payload is sent using a Generic Push Layer protocol.

3. The method according to claim 1, further comprising, at the Network Application Function node, receiving the identifier embryo from a Bootstrapping Function node.

4. The method according to claim 3, further comprising, at the Network Application Function node, sending a request message to the Bootstrapping Function node, the request message including a request for the identifier embryo.

5. The method according to claim 1, wherein the identifier embryo further includes any of a Bootstrapping Temporary Identifier (B-TID), and a P-TID.

6. The method according to claim 1, wherein the P-TID embryo is pushed from a Bootstrapping Function node.

7. The method according to claim 1, wherein the identifier embryo comprises a P-TID allocated to the Network Application Function node by a Bootstrapping Function node.

8. The method according to claim 1, further comprising, at the Network Application Function node:
receiving from a Bootstrapping Function node a Bootstrapping Temporary Identifier (B-TID);
allocating a P-TID for use in communicating with the client device; and
sending the P-TID to the client device.

9. The method according to claim 8, further comprising, prior to sending the P-TID to the client device, receiving from the client device a request for the P-TID.

10. The method according to claim 8, further comprising allocating the P-TID by applying a one-way function to the received B-TID and a further value.

11. A client device for use in a communications network, the client device comprising:
a processor for determining that no Security Association identifier between the client device and a Network Application Function node is locally available;
a memory for storing an identifier embryo, the processor being arranged to construct a Security Association identifier using the identifier embryo; and
a transmitter for sending a payload towards the Network Application Functions node, the payload being protected using a Security Association associated with the constructed Security Association identifier, wherein
the identifier embryo comprises a P-TID embryo, the processor being further arranged to calculate a Push Temporary Identifier (P-TID) for use as the Security Association identifier by performing a one-way function on the P-TID embryo and a value known to both the client device and the Network Application Function node.

12. The client device according to claim 11, wherein the identifier embryo further comprises any of a Bootstrapping Temporary Identifier (B-TID) and a P-TID.

13. A Network Application Function node for use in a communications network, the Network Application Function node comprising:
a processor arranged to determine that no Security Association identifier between a client device and the Network Application Function node is locally available;
a receiver for obtaining from a remote Bootstrapping Function node an identifier embryo used between the client device and the Bootstrapping Function node, the processor being further arranged to construct a Security Association identifier using the identifier embryo; and
a transmitter for sending to the client device payload data protected using a Security Association associated with the constructed Security Association identifier, wherein the identifier embryo comprises a Push Temporary Identifier (P-TID) embryo, the processor being further arranged to calculate a P-TID for use as the Security Association identifier by performing a one-way function on the P-TID embryo and a value known to both the client device and the Network Application Function node.

14. The Network Application Function node according to claim 13, further comprising a second transmitter arranged to send a request message to the Bootstrapping Function node, the request message including a request for the identifier embryo.

15. The Network Application Function node according to claim 13, wherein the identifier embryo comprises a P-TID allocated to the Network Application Function node by the Bootstrapping Function node.

16. The Network Application Function node according to claim 13, wherein the identifier embryo comprises a Bootstrapping Temporary Identifier (B-TID), the processor is arranged to allocate a P-TID for use in communicating with the client device, and the transmitter is arranged to send the P-TID to the client device.

17. The Network Application Function node according to claim 13, further comprising a second receiver for, prior to sending the P-TID to the client device, receiving from the client device a request for the P-TID.

18. The Network Application Function node according to claim 13, wherein the processor is arranged to allocate the P-TID by applying a one-way function to the received B-TID and a further value.

19. The Network Application Function node according to claim 13, further comprising a third receiver for receiving from the client device payload data protected by the Security Association associated with the constructed Security Association identifier.

20. A computer program product comprising a non-transitory computer readable medium storing a computer program comprising computer readable code which, when run by a processor in an apparatus, causes the apparatus to perform a method comprising:
  determining that no existing Security Association identifier between a client device and a Network Application Function node is locally available;
  obtaining an identifier embryo;
  constructing a Security Association identifier using the identifier embryo; and
  protecting a payload sent between the client device and the Network Application Function node using a Security Association associated with the constructed Security Association identifier, wherein
  the identifier embryo includes a Push Temporary Identifier (P-TID) embryo, the method comprising the client device and the Network Application Function node independently calculating a P-TID by performing a one-way function on the P-TID embryo and a value known to both the client device and the Network Application Function node.

21. The client device of claim 11, wherein the client device is a vehicle.

* * * * *